(12) United States Patent
Kida

(10) Patent No.: US 7,336,274 B2
(45) Date of Patent: Feb. 26, 2008

(54) POSITION RELATED INFORMATION PRESENTATION SYSTEM, POSITION RELATED INFORMATION PRESENTATION METHOD AND RECORDING MEDIUM RECORDING CONTROL PROGRAM THEREOF

(75) Inventor: Koji Kida, Tokyo (JP)

(73) Assignee: NEC Corporation, Tokyo (JP)

(*) Notice: Subject to any disclaimer, the term of this patent is extended or adjusted under 35 U.S.C. 154(b) by 123 days.

(21) Appl. No.: 11/298,593

(22) Filed: Dec. 12, 2005

(65) Prior Publication Data

US 2006/0092155 A1 May 4, 2006

Related U.S. Application Data

(62) Division of application No. 10/012,706, filed on Dec. 12, 2001, now Pat. No. 6,999,079.

(30) Foreign Application Priority Data

Dec. 13, 2000 (JP) .............................. 2000-378231

(51) Int. Cl.
*G06T 15/00* (2006.01)

(52) U.S. Cl. ..................... 345/425; 345/557; 382/164; 715/748

(58) Field of Classification Search ................ 345/425, 345/949–960, 419, 557, 582, 589, 593; 382/164, 382/165; 715/748, 500
See application file for complete search history.

(56) References Cited

U.S. PATENT DOCUMENTS

| 5,956,039 A | 9/1999 | Woods et al. ................ 345/419 |
| 6,201,544 B1 | 3/2001 | Ezaki ........................... 345/419 |
| 6,999,079 B2 * | 2/2006 | Kida ............................ 345/427 |
| 7,274,378 B2 * | 9/2007 | McAvoy et al. ............ 345/629 |

FOREIGN PATENT DOCUMENTS

| JP | 09-034902 A | 7/1997 |
| JP | 11-174951 A | 7/1999 |

* cited by examiner

Primary Examiner—Phu K. Nguyen
(74) Attorney, Agent, or Firm—Foley & Lardner LLP

(57) ABSTRACT

A position related information presentation method, and corresponding system and recording medium storing a corresponding program are provided. The method includes a number of steps. With respect to a display of area information related to a position indicated by data of a three-dimensional map superimposed on the data of the three-dimensional map, information is detected on superimposing of one object on another in a predetermined angle range centered on the moving direction from the current position. Related area information is searched for from the area information using information on superimposing of one object on another. The area information is searched for based on input/output keywords. A path is searched for from the current position to the position specified by the searched area information, wherein a guide to the position specified by the area information is displayed based on this search result.

8 Claims, 41 Drawing Sheets

FIG. 4

| T101 | T102 | T103 | T104 | T105 | T106 | T107 |
|---|---|---|---|---|---|---|
| CURRENT | LOCATION | ORIENTATION | FORWARD | BACK | LEFT | RIGHT |
| 3D000100 | (35.5060, 135.7050) | NORTH | 3D000101 | 3D000099 | 3D010100 | 3D020100 |
| 3D000101 | (35.5061, 135.7050) | NORTH | 3D000102 | 3D000101 | 3D010101 | 3D020101 |
| ... | ... | ... | ... | ... | ... | ... |

FIG. 6

| PID | URL | TITLE | LOCATION |
|---|---|---|---|
| 1 | http://www.xxx.com/ | (CORP.) xxxx HOMEPAGE | (35.5020, 135.7020) – (35.5030, 135.7040) |
| 2 | http://www.yyy.com/ | (CORP.) yyyy TOP PAGE | (35.4000, 135.7500) – (35.4010, 135.7510) |
| 3 | http://www.zzz.com/ | Welcome To ZZZ | (35.5010, 135.7070) – (35.5030, 135.7090) |
| 4 | http://www.aaa.com/ | aaa CORPORATION | (35.5050, 135.7070) – (35.5070, 135.7090) |
| 5 | http://www.bbb.com/ | bbb PORTAL | (35.6000, 135.7500) – (35.6010, 135.7510) |
| 6 | http://www.ccc.com/ | ccc SITE | (35.5050, 135.7090) – (35.5070, 135.7110) |
| 7 | http://www.ddd.com/ | WELCOME TO ddd PAGE | (35.5000, 135.6000) – (35.5010, 135.6010) |
| 8 | http://www.nnn.com/ | NNN BANK HOMEPAGE | (35.1050, 135.7090) – (35.1070, 135.7110) |
| 9 | http://www.mmm.com/ | MMM BANK | (35.9000, 135.6000) – (35.9010, 135.6010) |
| ••• | ••• | ••• | ••• |

| PID | URL | TITLE | LOCATION |
|---|---|---|---|
| 1 | http://www.xxx.com/ | (CORP.) xxx HOMEPAGE | (35.5020, 135.7020) – (35.5030, 135.7040) |
| 3 | http://www.zzz.com/ | Welcome To ZZZ | (35.5010, 135.7070) – (35.5030, 135.7090) |
| 4 | http://www.aaa.com/ | aaa CORPORATION | (35.5050, 135.7070) – (35.5070, 135.7090) |
| 6 | http://www.ccc.com/ | ccc SITE | (35.5050, 135.7090) – (35.5070, 135.7110) |

FIG. 12

| PID | URL | TITLE | LOCATION |
|---|---|---|---|
| 1 | http://www.xxx.com/ | (CORP.) xxx HOMEPAGE | (35.5020, 135.7020) – (35.5030, 135.7040) |

FIG. 13

| PID | URL | TITLE | LOCATION |
|---|---|---|---|
| 1 | http://www.xxx.com/ | (CORP.) xxx HOMEPAGE | (35. 5020, 135. 7020) – (35. 5030, 135. 7040) |
| 3 | http://www.zzz.com/ | Welcome To ZZZ | (35. 5010, 135. 7070) – (35. 5030, 135. 7090) |
| 4 | http://www.aaa.com/ | aaa CORPORATION | (35. 5050, 135. 7070) – (35. 5070, 135. 7090) |

FIG. 21

| PID | URL | TITLE | LOCATION | OBJECT PATH | DIVISION LEVEL |
|---|---|---|---|---|---|
| 1 | http://www.xxx.com/ | (CORP.) xxx HOMEPAGE | (35.5020, 135.7020)-(35.5030, 135.7040) | 0-001, 1-001, 2-002 | 2 |

| PID | URL | TITLE | LOCATION |
|---|---|---|---|
| 8 | http://www.nnn.com/ | NNN BANK HOMEPAGE | (35.1050, 135.7090) – (35.1070, 135.7110) |
| 9 | http://www.mmm.com/ | MMM BANK | (35.9000, 135.6000) – (35.9010, 135.6010) |

| PID | URL | TITLE | LOCATION |
|---|---|---|---|
| 8 | http://www.nnn.com/ | NNN BANK HOMEPAGE | (35. 1050, 135. 7090) — (35. 1070, 135. 7110) |

| STARTING NODE | ARRIVING NODE | DISTANCE |
|---|---|---|
| N 0 1 | N 0 2 | 2 |
| N 0 1 | N 0 4 | 1 |
| N 0 2 | N 0 3 | 1 |
| N 0 2 | N 0 5 | 2 |
| N 0 3 | N 0 6 | 1 |
| N 0 4 | N 0 5 | 3 |
| N 0 4 | N 0 7 | 1 |
| N 0 5 | N 0 6 | 1 |
| N 0 5 | N 0 8 | 1 |
| N 0 6 | N 0 9 | 1 |
| N 0 7 | N 0 8 | 1 |
| N 0 8 | N 0 9 | 1 |

T401 — STARTING NODE
T402 — ARRIVING NODE
T403 — DISTANCE

POSITION RELATED INFORMATION PRESENTATION SYSTEM, POSITION RELATED INFORMATION PRESENTATION METHOD AND RECORDING MEDIUM RECORDING CONTROL PROGRAM THEREOF

CROSS-REFERENCE TO RELATED PATENT APPLICATIONS

This application is a division of application Ser. No. 10/012,706, filed Dec. 12, 2001, now U.S. Pat. No. 6,999,079, and based on Japanese Patent Application No. 2000-378231 filed Dec. 13, 2000, by Koji KIDA. This application claims only subject matter disclosed in the parent application and therefore presents no new matter.

BACKGROUND OF THE INVENTION

1. Field of the Invention

The present invention relates to a position related information presentation system, a position related information presentation method and a recording medium recording control program thereof, and more particularly, to an information supply system that displays area information which is information related to a of town information, etc. on a three-dimensional map using a computer system.

2. Description of the Prior Art

As a conventional information supply system of this type, a system that presents area information which is position-related information such as town information using a computer system in a user-friendly fashion is proposed.

For example, a method of displaying information superimposed on a two-dimensional map is disclosed in the Japanese Patent Laid-open No. 9-34902 (reference 1). According to this technology, the user can use this method to obtain map information and information related to positions on the map such as advertisement all together and make a preliminary inquiry about information on a place before the user actually visits the place.

Furthermore, a technology for preventing information presented on a map from superimposing with each other is disclosed in the Japanese Patent Laid-open No. 11-174951 (reference 2). According to this technology, it is possible to display only information belonging to a specific category, hide other information and display information in an easy-to-see way.

For example, suppose an application that searches for area information on the current position while freely walking around on a three-dimensional map as shown in FIG. 2. The purpose of this application is to allow the user to experience a place on a simulated form by walking around in the three-dimensional map and collect information related to the place.

To realize such an application, the methods described in the above reference 1 and reference 2 can be used as the methods of displaying information superimposed on a map. However, simply adopting these methods involves the following problems.

According to the techniques described in reference 1 and reference 2, the user is supposed to see a two-dimensional map from above, and therefore when the user stands in that place in the real world, even information that the user actually cannot see due to the shadows of buildings, etc. is searched. In this case, it is necessary to present with higher priority information on positions that the user can see from that place.

Furthermore, the method whereby the user walk around on the three-dimensional map includes variations such as speed and height, and the type of information required varies depending on the user. For example, when the user is moving fast, the user needs rough information. On the other hand, when the user is moving slowly, the user needs more detailed information. The techniques described in reference 1 and reference 2 do not presuppose the method of use of the user walking around, and therefore cannot select information to be presented according to the way the user walks on the map.

Moreover, in the case when information which the user wants to search for is clear, the user may use a method of searching using keywords, etc. and pasting the search results on the map instead of the method of searching for area information while walking around on the three-dimensional map. However, since the techniques described in reference 1 and reference 2 are modes in which a two-dimensional map is seen from above, the problem is that it is difficult to grasp a relationship between a location on the map and the current location. Furthermore, there is commercially available map software capable of searching for a shortest path between two points, making it possible to display the shortest path from the current location to the location searched for. However, the shortest path is not always convenient to the user and this software does not allow the user to freely move in a certain direction of interest and walk around to a place related to the search result, that is, walk around on the map with a high degree of freedom.

SUMMARY OF THE INVENTION

It is an object of the present invention to solve the problems described above and provide a position related information presentation system, a position related information presentation method and a recording medium that records a control program thereof allowing the user to experience as if the user had walked around and collected information related to the area.

It is another object of the present invention to provide a position related information presentation system, a position related information presentation method and a recording medium that records a control program thereof capable of providing information according to the way the user walks around on the three-dimensional map and the division level on the map of the area covered by the information.

A first position related information presentation system according to the present invention includes field of view determining means for detecting, with respect to a display of area information related to a position indicated by data of a three-dimensional map superimposed on the data of the three-dimensional map, information on superimposing of one object on another in a predetermined angle range centered on the moving direction from the current position and position information filtering means for searching for the related area information from the area information related to a new display position searched in response to a display change instruction using the information on superimposing of one object on another.

A second position related information presentation system according to the present invention includes field of view determining means for detecting, with respect to a display of area information related to a position indicated by data of a three-dimensional map superimposed on the data of the three-dimensional map, information on superimposing of one object on another in a predetermined angle range centered on the moving direction from the current position, position granularity calculating means for calculating granularity of an area indicating a division level on the map of the area covered by the area information and position information filtering means for searching for the related area information from the area information using the level of details of information indicating the level of granularity of the required area information, the granularity of said area and said information on superimposing of one object on another.

A third position related information presentation system according to the present invention includes field of view determining means for detecting, with respect to a display of area information related to a position indicated by data of a three-dimensional map superimposed on the data of the three-dimensional map, information on superimposing of one object on another in a predetermined angle range centered on the moving direction from the current position, position granularity calculating means for calculating granularity of an area indicating a division level on the map of the area covered by the area information, operation intention determining means for estimating conditions of the required area information based on a movement instruction and position information filtering means for searching for the related area information from the area information using the condition estimated by the operation intention determining means, the granularity of the area and the information on superimposing of one object on another.

A fourth position related information presentation system according to the present invention includes field of view determining means for detecting, with respect to a display of area information related to a position indicated by data of a three-dimensional map superimposed on the data of the three-dimensional map, information on superimposing of one object on another in a predetermined angle range centered on the moving direction from the current position, position information filtering means for searching for the related area information from the area information using information on superimposing of one object on another, keyword searching means for searching for the area information based on input/output keywords and path searching means for searching for a path up to the position specified by the area information searched from the current position by the keyword searching means.

The portable terminal apparatus of the position related information presentation system according to the present invention includes superimposed displaying means for displaying area information related to a position expressed with data of a three-dimensional map superimposed on the data of the three-dimensional map, field of view determining means for detecting information on superimposing of one object on another in a predetermined angle range centered on the moving direction from the current position with respect to the display of the superimposed displaying means and position information filtering means for searching for the related area information from the area information related to a new display position searched in response to a display change instruction using the information on the superimposing of one object on another.

A first position related information presentation method according to the present invention includes the steps of detecting, with respect to a display of area information related to a position indicated by data of a three-dimensional map superimposed on the data of the three-dimensional map, information on superimposing of one object on another in a predetermined angle range centered on the moving direction from the current position; and searching for the related area information from the area information related to a new display position searched in response to a display change instruction using the information on superimposing of one object on another.

A second position related information presentation method according to the present invention includes the steps of detecting, with respect to a display of area information related to a position indicated by data of a three-dimensional map superimposed on the data of the three-dimensional map, information on superimposing of one object on another in a predetermined angle range centered on the moving direction from the current position; calculating granularity of an area indicating a division level on the map of the area covered by the area information; and searching for the related area information from the area information using the level of details of information indicating the level of granularity of the required area information, the granularity of said area and said information on superimposing of one object on another.

A third position related information presentation method according to the present invention includes the steps of detecting, with respect to a display of area information related to a position indicated by data of a three-dimensional map superimposed on the data of the three-dimensional map, information on superimposing of one object on another in a predetermined angle range centered on the moving direction from the current position; calculating granularity of an area indicating a division level on the map of the area covered by the area information; estimating conditions of the required area information based on a movement instruction; and searching for the related area information from the area information using the estimated condition, the granularity of the area and the information on superimposing of one object on another.

A fourth position related information presentation method according to the present invention includes the steps of detecting, with respect to a display of area information related to a position indicated by data of a three-dimensional map superimposed on the data of the three-dimensional map, information on superimposing of one object on another in a predetermined angle range centered on the moving direction from the current position; searching for the related area information from the area information using information on superimposing of one object on another; searching for the area information based on input/output keywords; and searching for a path from the current position to the position specified by the searched area information, wherein a guide to the position specified by the area information is displayed based on this search result.

A fifth position related information presentation method according to the present invention includes the steps of displaying area information related to a position expressed with data of a three-dimensional map superimposed on the data of the three-dimensional map; detecting information on the superimposing of one object on another in a predetermined angle range centered on the moving direction from the current position with respect to the display; and searching for the related area information from the area information related to a new display position searched in response to a display change instruction using the information on the superimposing of one object on another.

A sixth position related information presentation method according to the present invention is a position related information presentation method for displaying area information related to a position specified with position information on three-dimensional map using a computer system, including the steps of detecting a change of the condition of the three-dimensional map; searching for area information at the current position from the current map condition using a database; extracting information of buildings in the field of view of the operator from the search results; and displaying this extraction result.

A first recording medium that records a position related information presentation control program according to the present invention for presenting position related information renders a computer to detect, with respect to a display of area information related to a position indicated by data of a three-dimensional map superimposed on the data of the three-dimensional map, information on superimposing of one object on another in a predetermined angle range centered on the moving direction from the current position and search for the related area information from the area information related to a new display position searched in response to a display change instruction using the information on superimposing of one object on another.

A second recording medium that records a position related information presentation control program according to the present invention for presenting position related information renders a computer to detect, with respect to a display of area information related to a position indicated by data of a three-dimensional map superimposed on the data of the three-dimensional map, information on superimposing of one object on another in a predetermined angle range centered on the moving direction from the current position, calculate granularity of an area indicating a division level on the map of the area covered by the area information and search for the related area information from the area information using the level of details of information indicating the level of granularity of the required area information, the granularity of the area and the information on the superimposing of one object on another.

A third recording medium that records a position related information presentation control program according to the present invention for presenting position related information renders a computer to detect, with respect to a display of area information related to a position indicated by data of a three-dimensional map superimposed on the data of the three-dimensional map, information on superimposing of one object on another in a predetermined angle range centered on the moving direction from the current position, calculate granularity of an area indicating a division level on the map of the area covered by the area information, estimate conditions of the required area information based on a movement instruction and search for the related area information from the area information using the estimated condition, the granularity of the area and the information on superimposing of one object on another.

A fourth recording medium that records a position related information presentation control program according to the present invention for presenting position related information renders a computer to detect, with respect to a display of area information related to a position indicated by data of a three-dimensional map superimposed on the data of the three-dimensional map, information on superimposing of one object on another in a predetermined angle range centered on the moving direction from the current position, search for the related area information from the area information using the information on superimposing of one object on another, search for the area information based on input/output keywords and search for a path up to the position specified by the area information searched from the current position, wherein a guide to the position specified by the area information is displayed based on this search result.

A fifth recording medium that records a position related information presentation control program according to the present invention for presenting position related information renders a portable terminal apparatus to display area information related to a position expressed with data of a three-dimensional map superimposed on the data of the three-dimensional map, detect information on superimposing of one object on another in a predetermined angle range centered on the moving direction from the current position with respect to the display and search for the related area information from the area information related to a new display position searched in response to a display change instruction using the information on the superimposing of one object on another.

That is, the first position related information presentation method according to the present invention is a position related information presentation method that presents position related area information on a three-dimensional map using a computer system in a manner easy-to-understand to the user, including the steps of detecting a change of state on the three-dimensional map; searching for related area information from the current state of the map from a database; extracting area information visible to the user from the search result; and displaying this extraction result to the user.

The second position related information presentation method according to the present invention is a position related information presentation method that presents position related area information such as town information on a three-dimensional map using a computer system in a manner easy-to-understand to the user, including the steps of detecting a change of state on the three-dimensional map; searching for related area information from the current state of the map from a database; calculating granularity of the area covered by area information with respect to each search result; extracting area information that matches the condition of the area information requested by the user and is visible to the user; and displaying this extraction result to the user.

The third position related information presentation method according to the present invention is a position related information presentation method that presents position related area information such as town information on a three-dimensional map using a computer system in a manner easy-to-understand to the user, including the steps of detecting a change of state on the three-dimensional map; searching for related area information from the current state of the map from a database; calculating granularity of the area covered by area information with respect to each search result; estimating the condition of area information requested by the user judging from the user operations on the three-dimensional map; extracting area information that matches the condition of the area information the user wants and is visible to the user; and displaying this extraction result to the user.

The fourth position related information presentation method according to the present invention is a position related information presentation method that presents position related area information such as town information on a three-dimensional map using a computer system in a manner easy-to-understand to the user, including the steps of searching for area information using keywords from a database; calculating the shortest path from the user location on the map to a place related to the search result; and guiding the user based on the calculation result of this step of calculating the shortest path.

The fifth position related information presentation method according to the present invention adds to the configuration of the fourth position related information presentation method according to the present invention a step of controlling the step of calculating the shortest path so as to recalculate the shortest path every time the user location changes so that the user need not always move according to the guide and the user can thereby receive a guide with a high degree of freedom.

More specifically, the first position related information presentation system according to the present invention is a position related information presentation system that presents position related area information such as town information on a three-dimensional map using a computer system in a manner easy-to-understand to the user, comprising 3D (3 Dimensions) map storing means for storing 3D display data of a map, 3D map/information superimposed displaying means for reading 3D map data from the 3D map storing means and displaying area information which is position related information such as town information related to the area displayed on the 3D map superimposed on the 3D map to the user, display change inputting means for allowing the user to perform display change operations such as moving forward, backward or turning directions with respect to the display by the 3D map/information superimposed displaying means, position information storing means which is a database storing area information which is position related information such as town information, position information searching means for searching for information related to a new display position from the area information storing means when the user changes the display of the 3D map using the display changing means, field of view determining means for detecting objects the user can currently view by detecting information on the superimposing of one object on another such as buildings using the map of the map database with respect to the map database which is a 2D (2 Dimensions) map database and the display of the 3D map/information superimposed displaying means viewed from the user's current position, and position information filtering means for searching object-related area information calculated by the field of view determining means and visible to the user from the area information searched by the position information searching means and requesting the 3D map/information superimposed displaying means to display the searched area information superimposed on the 3D map to the user.

The second position related information presentation system according to the present invention adds position granularity calculating means for calculating granularity of an area indicating a division level on the map of the area covered by area information to the configuration of the above-described first position related information presentation system of the present invention, thereby allowing the user to specify the granularity of preferred area information as a search condition of area information.

The third position related information presentation system according to the present invention adds user operation intention determining means for estimating the condition of area information requested by the user judging from the user operation carried out using the display change inputting means to the configuration of the above-described second position related information presentation system of the present invention, thereby making it possible to select and display appropriate area information based on the way the 3D map moves even if the user does not particularly specify search conditions of area information.

The fourth position related information presentation system according to the present invention adds keyword searching means for searching area information by inputting keywords and path searching means for searching the path from the current location to a place related to the search result to the configuration of the above-described position related information presentation system, thereby making it possible, when there is definitely area information for which the user wants to search, to search for the area information using the keyword searching means first and navigate to a place related to the search result on the map.

The fifth position related information presentation system according to the present invention allows the path searching means of the fourth position related information presentation system to recalculate the shortest path every time the user location changes so that the user need not always move according to the guide and thereby allows the user to receive a guide with a high degree of freedom.

The conventional system has a problem that since the user is supposed to see a two-dimensional map from above, when the user stands in that place in the real world, even information that the user actually cannot see due to the shadows of buildings, etc. is searched. In contrast to this, the position related information presentation system according to the present invention solves this problem by comprising field of view determining means for determining the user field of view on a 3D map and position information filtering means for extracting area information actually visible to the user from the area information search result based on this determination result.

Furthermore, the method of walking around on a 3D map is subject to variations in the speed and height, etc. and information requested by the user varies from one user to another. For example, when the user is moving fast, rough information is required and when the user is moving slowly, detailed information is required. The conventional system is not intended for a use by a user who is walking around, and therefore it is not possible to select information to be presented according to the way the user walks around on the map. In contrast, the position related information presentation system according to the present invention solves the conventional problem by comprising position granularity calculating means for calculating granularity of an area covered by the searched area information and user operation intention determining means for determining from the user operations on the 3D map whether the user wants rough information or detailed information.

Furthermore, the position related information presentation system according to the present invention not only can search peripheral information while walking around on a 3D map, but also includes in the configuration the keyword searching means and path searching means allowing the user to search information using keywords first and navigate on the 3D map to reach a place related to the information, recalculates the path every time the user location changes, thus eliminating the need for the user to always move according to the guide, thereby providing the user with a guide with a high degree of freedom.

BRIEF DESCRIPTION OF THE DRAWINGS

FIG. 4 illustrates a configuration example of 3D map storing portion in FIG. 1;

FIG. 6 illustrates a configuration example of position information storing portion in FIG. 1;

FIG. 7 illustrates an example of search result of the position information searching portion in FIG. 1;

FIG. 12 illustrates a filtering result of the first embodiment of the present invention;

FIG. 13 illustrates the filtering result of the first embodiment of the present invention;

FIG. 21 illustrates a filtering result according to the second embodiment of the present invention;

FIG. 29 shows an example of a search result of the keyword searching portion in FIG. 26;

FIG. 31 illustrates a search result of the keyword searching portion in FIG. 26;

FIG. 35 illustrates a configuration example of a table that stores starting nodes, arriving nodes and the distances between them shown in FIG. 34;

DETAILED DESCRIPTION OF THE PREFERRED EMBODIMENTS

Figure 1:
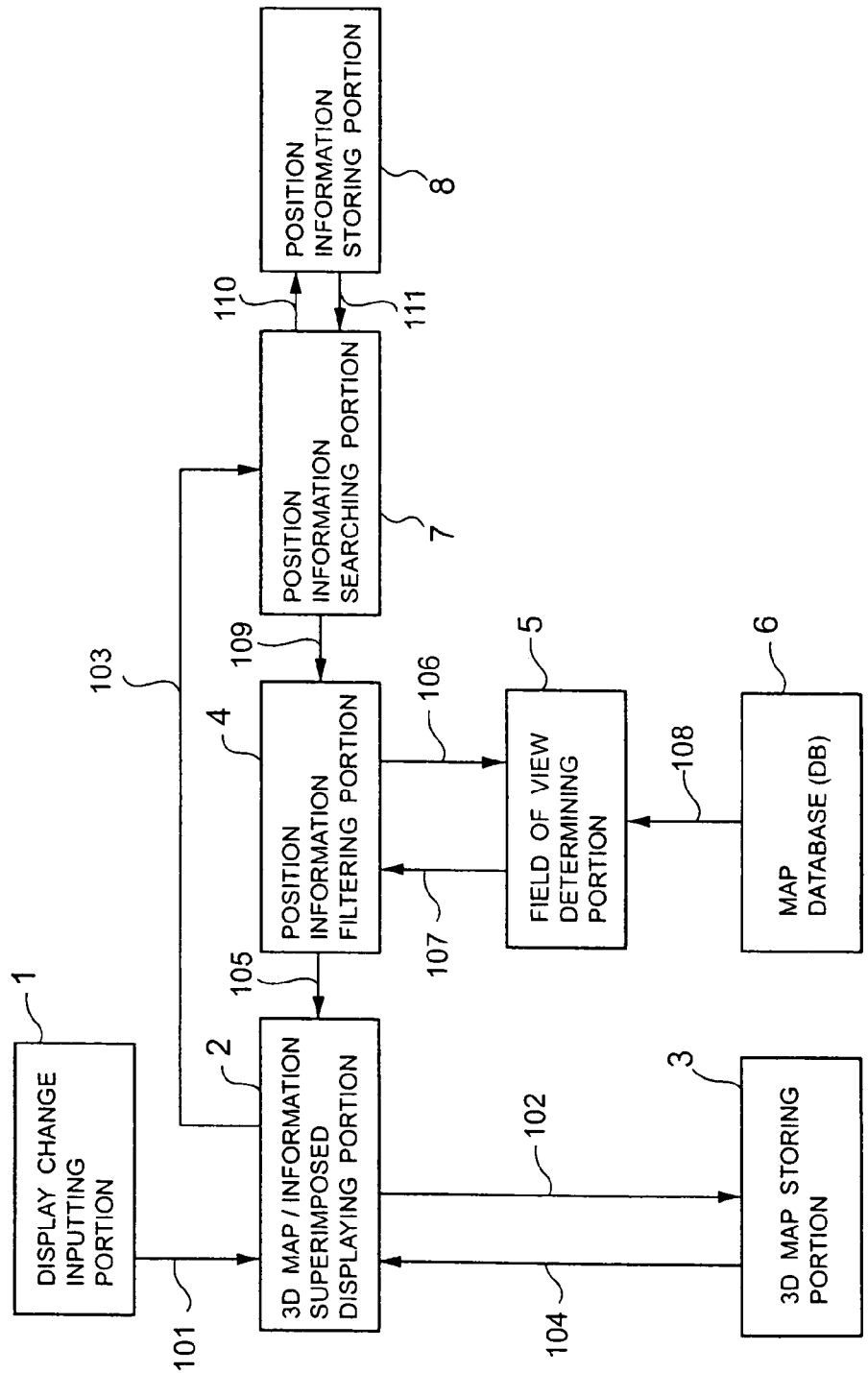
FIG. 1 is a block diagram showing a configuration of a position related information presentation system according to a first embodiment of the present invention.

Next, with reference now to the attached drawings, embodiments of the present invention will be explained in detail below. FIG. 1 is a block diagram showing a configuration of a position related information presentation system according to a first embodiment of the present invention. In FIG. 1, the position related information presentation system according to the first embodiment of the present invention is constructed of display change inputting portion 1, 3D (3 Dimensions) map/information superimposed displaying portion 2, 3D map storing portion 3, position information filtering portion 4, field of view determining portion 5, a map database (DB) 6, position information searching portion 7 and position information storing portion 8.

The 3D map storing portion 3 stores 3D display data of a map, the 3D map/information superimposed displaying portion 2 reads 3D map data from the 3D map storing portion 3 and displays area information related to the area displayed in the 3D map superimposed on the 3D map to the user. The display change inputting portion 1 gives the 3D map/information superimposed displaying portion 2 instructions on the user's display change operations such as moving forward, moving backward or changing the direction of the display of the 3D map/information superimposed displaying portion 2.

The position information storing portion 8 is a database that stores position information and area information related to a position specified by the position information. The position information searching portion 7 searches for area information related to a new display position from the position information storing portion 8 triggered off by the user changing the display of the 3D map using the display change inputting portion 1.

Here, the position information indicates a certain area or point on a map and is described with, for example, "address", "postal code" and "latitude, longitude". Hereafter, in this embodiment, position information is expressed in a form of "(latitude, longitude)—(latitude, longitude)" which indicate two diagonal points of a rectangle which approximates an area on the map.

Furthermore, the area information refers to data related to a place (position) specified by the above-described position information, for example, name of a building located in the place specified by the position information, advertisement of a shop in the building, homepage address [URL (Uniform Resource Locator)] of a company or organization, etc. in the building.

Hereafter, in this embodiment, suppose area information will be expressed by a homepage URL or title of a company or organization existing in a place specified by the position information. However, in addition to the above-described information, it is also possible to use a telephone directory including types of business, registered names, telephone numbers, etc. which is a commercially available database, entertainment magazine databases of movie information including titles and schedules or event information or map database including location names, time from the nearest station, etc. in association with various kinds of information, and in that case such various kinds of information can also be used as area information.

The map database 6 is a 2D (2 Dimensions) map. The field of view determining portion 5 detects objects currently visible to the user by detecting information on superimposing of one object on another such as buildings using the map of the map database 6 when viewed from the current position of the user with respect to the display by the 3D map/information superimposed displaying portion 2.

The position information filtering portion 4 searches area information related to the objects visible to the user calculated by the field of view determining portion 5 from the area information searched by the position information searching portion 7 and requests the 3D map/information superimposed displaying portion 2 to display the area information superimposed on the 3D map to the user.

Figure 2:
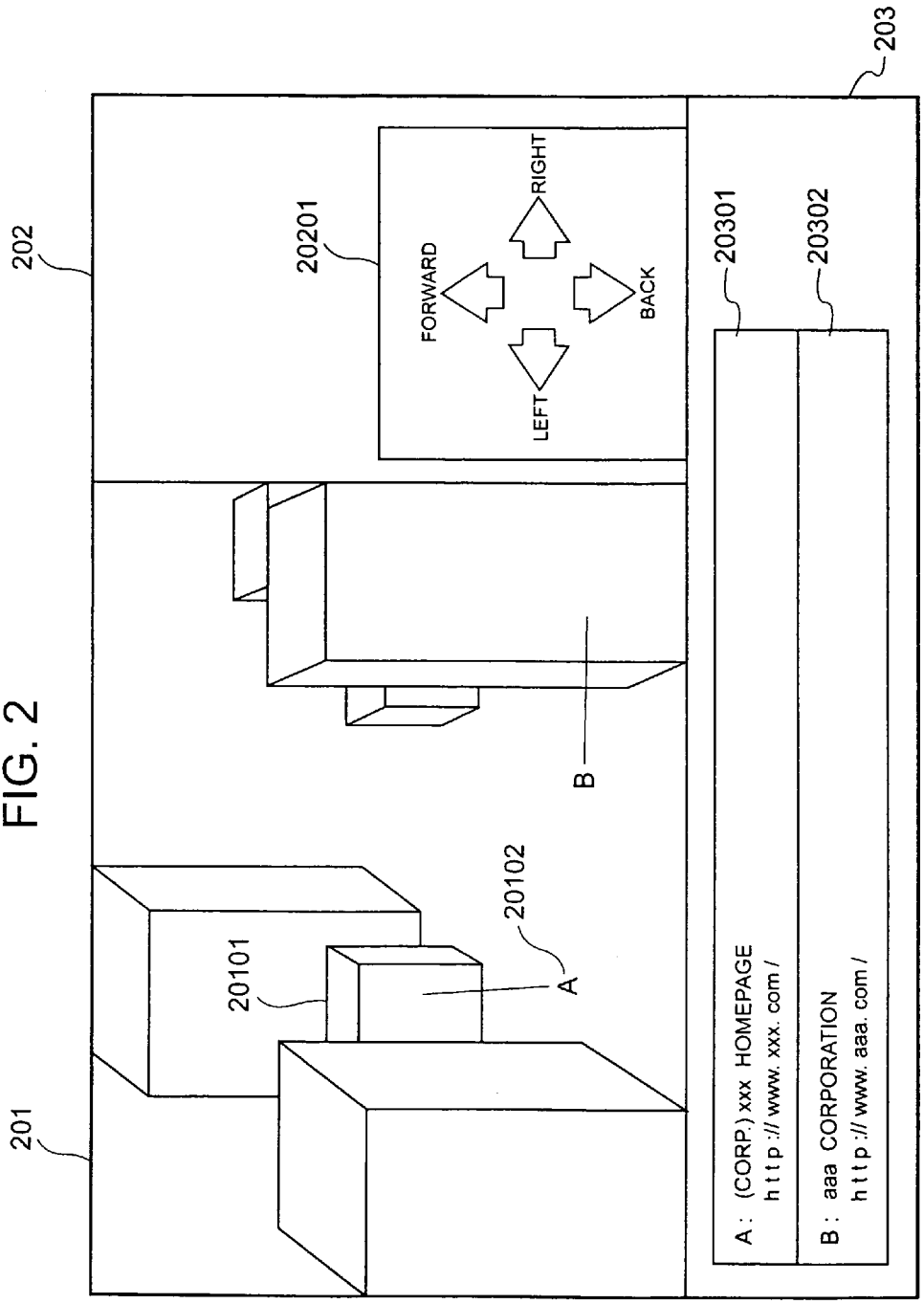
FIG. 2 illustrates an example of a display screen according to the first embodiment of the present invention.

FIG. 2 illustrates an example of a display screen according to the first embodiment of the present invention. FIG. 2 shows an example of a display screen displayed by the 3D map/information superimposed displaying portion 2. With reference to this FIG. 2, an application that allows the user to search area information on the current position (position currently displayed) on the 3D map while walking around on the 3D map will be explained below. As a graphical user interface, the present invention assumes a personal computer, etc. which is operated using input devices such as a mouse and keyboard.

In FIG. 2, the screen displayed by the 3D map/information superimposed displaying portion 2 is constructed of three areas of a 3D map display area 201, a user operation input area 202, and an area information link display area 203.

The 3D map display area 201 is an area to display a map stored in the 3D map storing portion 3 and is constructed of an object 20101 such as a building and a link 20102 to the area information related to the building. The link 20102 to the area information is assigned symbols ("A", "B", etc.) which correspond to the symbols assigned to the area information displayed in the area information link display area 203.

In the case of the screen example shown in FIG. 2, the area information on the object 20101 is the URL and title of a company in the "Building A" expressed with the link 20102 and the detail of this is "(Corp.) xxx homepage http:/www.xxx.com/" described in the area information 20301.

The user operation input area 202 is an area where the user makes entries to change the display of the 3D map display area 201 and in the case of the screen example shown in FIG. 2, the user can enter "Forward", "Back", "Left" and "Right" in the area 20201, and the content of the 3D map displayed in the 3D map display area 201 and the content of the area information related to the 3D map displayed in the area information link display area 203 are changed according to the respective entries. However, some operations may be invalid depending on the display contents (dead end, etc.) of the 3D map display area 201. A flow of this display change processing will be explained later.

The area information link display area 203 shows a list of area information related to the 3D map. In the case of the screen example shown in FIG. 2, there are two pieces of area information. The first area information 20301 is "(Corp.) xxx homepage http:/www.xxx.com/" and the second area information 20302 is "aaa Corporation http://www.aaa.com/". Here, the line starting with "http://" means a link to information on the Internet and when the user clicks on this line with a mouse, a browser starts and a page of the link destination is displayed on the browser.

Figure 3:
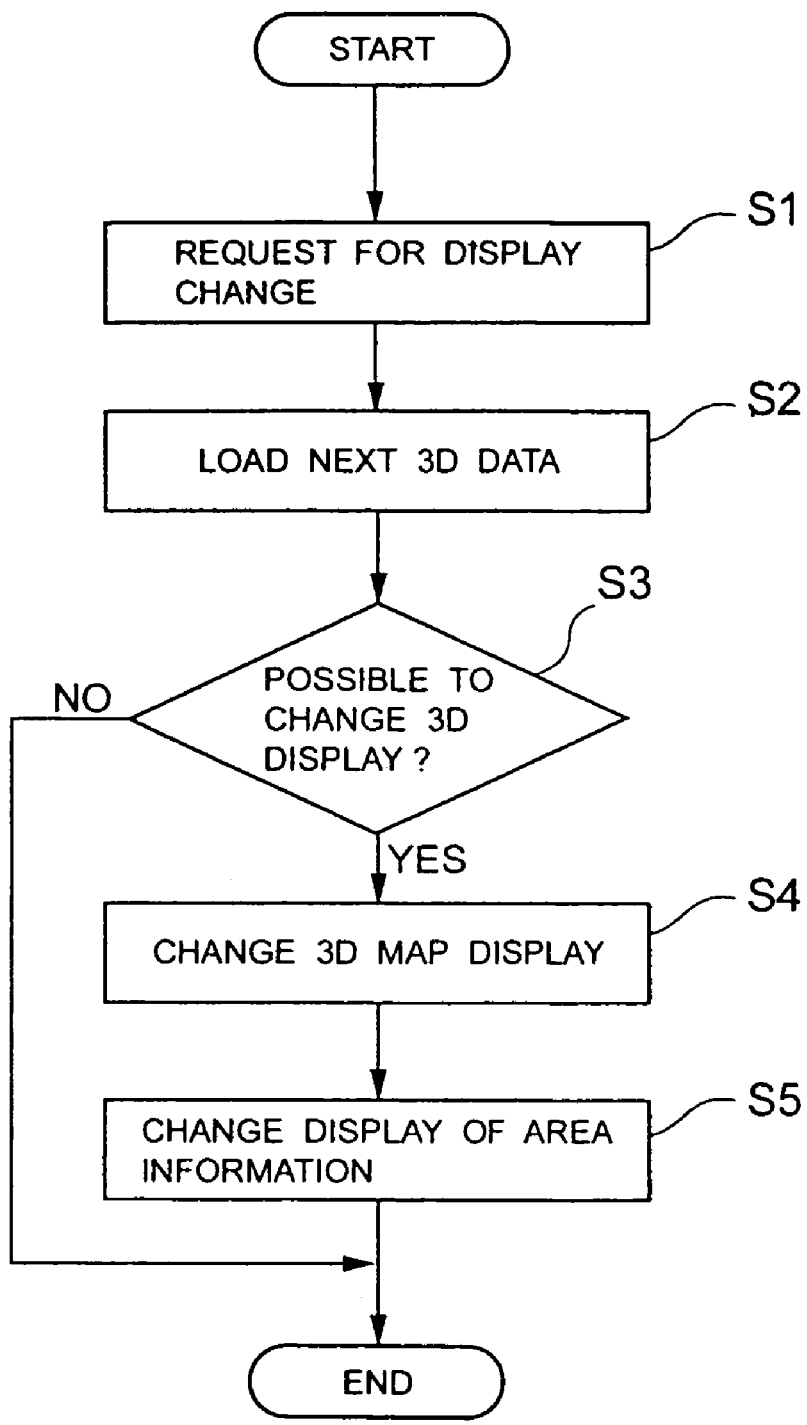
FIG. 3 is a flow chart showing a display change processing according to the first embodiment of the present invention.

FIG. 3 is a flow chart showing display change processing according to the first embodiment of the present invention and FIG. 4 illustrates a configuration example of the 3D map storing portion 3 in FIG. 1. With reference to these FIG. 1 to FIG. 4, the display change processing according to the first embodiment of the present invention will be explained.

The user enters display changes to the screen displayed by the 3D map/information superimposed displaying portion 2 using the user operation input area 202 (step S1 in FIG. 3). The display change input portion 1 requests the 3D map/information superimposed displaying portion 2 to execute the content of the user operation (one of "Forward", "Back", "Left" and "Right") by using a request signal 101.

The 3D map/information superimposed displaying portion 2 stores the file name (hereinafter referred to as "current file name") of the currently displayed 3D map, the location (hereinafter referred to as "current location") of the currently displayed 3D map and the orientation (hereinafter referred to as "current direction") of the currently displayed 3D map.

The 3D map/information superimposed displaying portion 2 inquires the 3D map storing portion 3 about the next 3D map data to be displayed according to the notification content using an inquiry signal 102. In that case, the 3D map/information superimposed displaying portion 2 sends the current file name of the 3D map, the contents of the user operation (one of "Forward", "Back", "Left" and "Right") to the 3D map storing portion 3 as parameters. FIG. 4 shows an example of the 3D map database stored in the 3D map storing portion 3.

In FIG. 4, field T101 denotes the file name of the 3D map; field T102, the location of the 3D map [expressed as (north latitude, east longitude)]; field T103, the orientation of the 3D map (expressed as "East", "West", "South", "North"); field T104, the file name of the 3D map in the case of "Forward" (if this operation is not available, the value is a blank); field T105, the file name of the 3D map in the case of "Back" (if this operation is not available, the value is a blank); field T106, the file name of the 3D map in the case of "Left" (if this operation is not available, the value is a blank); field T107, the file name of the 3D map in the case of "Right" (if this operation is not available, the value is a blank).

The 3D map storing portion 3 searches for a record where the file name of the current map matches the value of field T101. The value of field T101 is designed to be a main key and it is designed that one record necessarily matches this value.

The file name of the next 3D map (hereinafter referred to as "next file name") is obtained from the values of fields T104 to T107 of the record that matches according to the contents of the user operations (one of "Forward", "Back", "Left" and "Right").

When the next file name is not "blank", a record where the next file name matches the value of field T101 is searched. The value of field T102 of the record that matches this search is the location of the next 3D map (hereinafter referred to as "next location") and the value of field T103 is the orientation of the next 3D map (hereinafter referred to as "next orientation").

The 3D map storing portion 3 sends the above-described "next file name", "next location" and "next orientation" to the 3D map/information superimposed displaying portion 2 using a response signal 104.

In the example shown in FIG. 4, the current file name is "3D000100" and in the case where the user operation is "Forward", "3D000101" is the next file. The 3D map storing portion 3 searches for field T101 that matches the next file name "3D000101" and if the value "(35.5061, 135.7050)" is obtained as the "next location" and the value "North" is obtained as the "next orientation", these values are sent to the 3D map/information superimposed displaying portion 2. This causes the next 3D data to be loaded to the 3D map/information superimposed displaying portion 2 (step S2 in FIG. 3).

However, in the case where the "next file name" is "blank", the user operation content is regarded as a "failure" and the 3D map storing portion 3 sends "failure" to the 3D map/information superimposed displaying portion 2 using the response signal 104.

If the reply from the 3D map storing portion 3 is a file name (step S3 in FIG. 3), the 3D map/information superimposed displaying portion 2 moves on to step S4 and if the reply is "failure" (step S3 in FIG. 3), the 3D map/information superimposed displaying portion 2 finishes the display change processing.

The 3D map/information superimposed displaying portion 2 loads the next file name that has received the reply from the 3D map storing portion 3 and changes the display of the 3D map display area 201 (step S4 in FIG. 3). The 3D map/information superimposed displaying portion 2 changes the values of the "current file name", "current location" and "current orientation" to "next file name", "next location" and "next orientation", respectively. In response to the change of the display of the 3D map, the 3D map/information superimposed displaying portion 2 carries out area information change processing (step S5 in FIG. 3) and finishes the display change processing.

Figure 5:
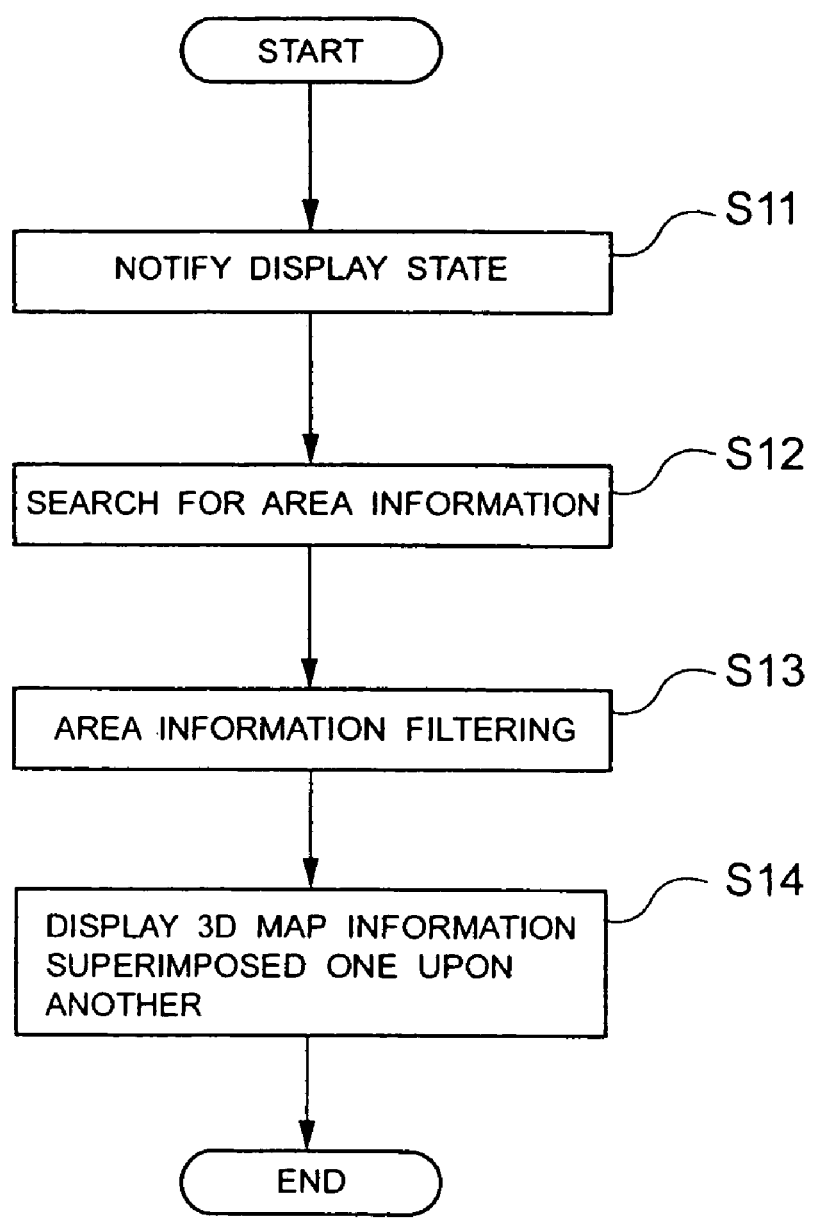
FIG. 5 is a flow chart showing an area information change processing according to the first embodiment of the present invention.

FIG. 5 is a flow chart showing the area information change processing according to the first embodiment of the present invention, FIG. 6 illustrates a configuration example of the position information storing portion 8 in FIG. 1 and FIG. 7 illustrates an example of a search result of the position information searching portion 7 in FIG. 1. With reference to these FIG. 1, FIG. 2 and FIG. 5 to FIG. 7, the area information change processing according to the first embodiment of the present invention will be explained.

The 3D map/information superimposed displaying portion 2 requests the position information searching portion 7 to change the area information using a request signal 103 (step S11 in FIG. 5). In this case, the 3D map/information superimposed displaying portion 2 sends the updated "current location" and "current orientation" to the position information searching portion 7 as parameters. In this case, the "current location" is "(35.5061,135.7050)" and the current orientation is "North".

The position information searching portion 7 searches for area information in the position information storing portion 8 using a search signal 110 (step S12 in FIG. 5). The system predetermines a range to be searched as the area information based on the current position. For simplification of explanations, now suppose the search range is "north latitude±0.006" and "east longitude±0.005" from the current position.

The position information storing portion 8 stores the information of page groups on the Internet classified by position as area information. In FIG. 6, field T201 denotes "area information ID (identification information) (PID)"; field T202, "Internet URL of page"; field T203, "page title"; field T204, "page-related location [for convenience, the place is approximated with a rectangle and its two diagonal points are expressed with (north latitude, east longitude)—(north latitude, east longitude)]".

For example, in the example shown in FIG. 6, when the "area information ID" is "1", "http://www.xxx.com/" is stored as "URL", "(Corp.) xxx homepage" is stored as "title", "(35.5020, 135.7020)-(35.5030, 135.7040)" is stored as "location".

When the "area information ID" is "2", "http://www.yyy.com/" is stored as "URL", "(Corp.) yyy top page" is stored as "title", "(35.4000, 135.7500)-(35.4010, 135.7510)" is stored as "location".

When the "area information ID" is "3", "http://www.zzz.com/" is stored as "URL", "Welcome To ZZZ" is stored as "title", "(35.5010, 135.7070)-(35.5030, 135.7090)" is stored as "location".

When the "area information ID" is "4", "http://www.aaa.com/" is stored as "URL", "aaa Corporation" is stored as "title", "(35.5050, 135.7070)-(35.5070, 135.7090)" is stored as "location".

When the "area information ID" is "5", "http://www.bbb.com/" is stored as "URL", "bbb Portal" is stored as "title", "(35.6000, 135.7500)-(35.6010, 135.7510)" is stored as "location".

When the "area information ID" is "6", "http://www.ccc.com/" is stored as "URL", "ccc site" is stored as "title", "(35.5050, 135.7090)-(35.5070, 135.7110)" is stored as "location".

When the "area information ID" is "7", "http://www.ddd.com/" is stored as "URL", "Welcome to ddd page" is stored as "title", "(35.5000, 135.6000)-(35.5010, 135.6010)" is stored as "location".

When the "area information ID" is "8", "http:H//www.nnn.com/" is stored as "URL", "NNN Bank homepage" is stored as "title", "(35.1050, 135.7090)-(35.1070, 135.7110)" is stored as "location".

When the "area information ID" is "9", "http://www.mmm.com/" is stored as "URL", "MMM Bank" is stored as "title", "(35.9000, 135.6000)-(35.9010, 135.6010)" is stored as "location".

The position information storing portion 8 calculates the search range from the current location, searches for a record whose value of field T204 is included within this search range and sends the record with the search result to the position information searching portion 7 using a response signal 111.

In the case of the example above, since the current location is "(35.5061, 135.7050)" and the search range is "north latitude±0.006" and "east longitude±0.005", the search result is as shown in FIG. 7 and the position information storing portion 8 sends the record set to the position information searching portion 7. That is, the position information storing portion 8 sends the record sets with "area information ID" of "1", "3", "4" and "6" to the position information searching portion 7.

The position information searching portion 7 sends the area information search result, "current location" and "current orientation" from the position information storing portion 8 to the position information filtering portion 4 using a search result signal 109.

The position information filtering portion 4 carries out filtering processing that deletes area information on a location which is not actually visible to the user due to the shadows of buildings, etc. when viewed from the user from the "current location" in the "current orientation" from the search result of the area information (step S13 in FIG. 5). The position information filtering portion 4 sends the search result of the area information subjected to filtering to the 3D map/information superimposed displaying portion 2 using a notification signal 105. The above-described filtering processing will be described later.

The 3D map/information superimposed displaying portion 2 updates the content of the area information link display area 203 (step S14 in FIG. 5) based on the search result of the area information sent from the position information filtering portion 4 and finishes this processing.

The position information filtering portion 4 requests the field of view determining portion 5 for filtering processing on the area information in step S13 above using a request signal 106. In that case, the position information filtering portion 4 sends the search result of the area information, "current location" and "current orientation" as parameters to the field of view determining portion 5.

Figure 8:
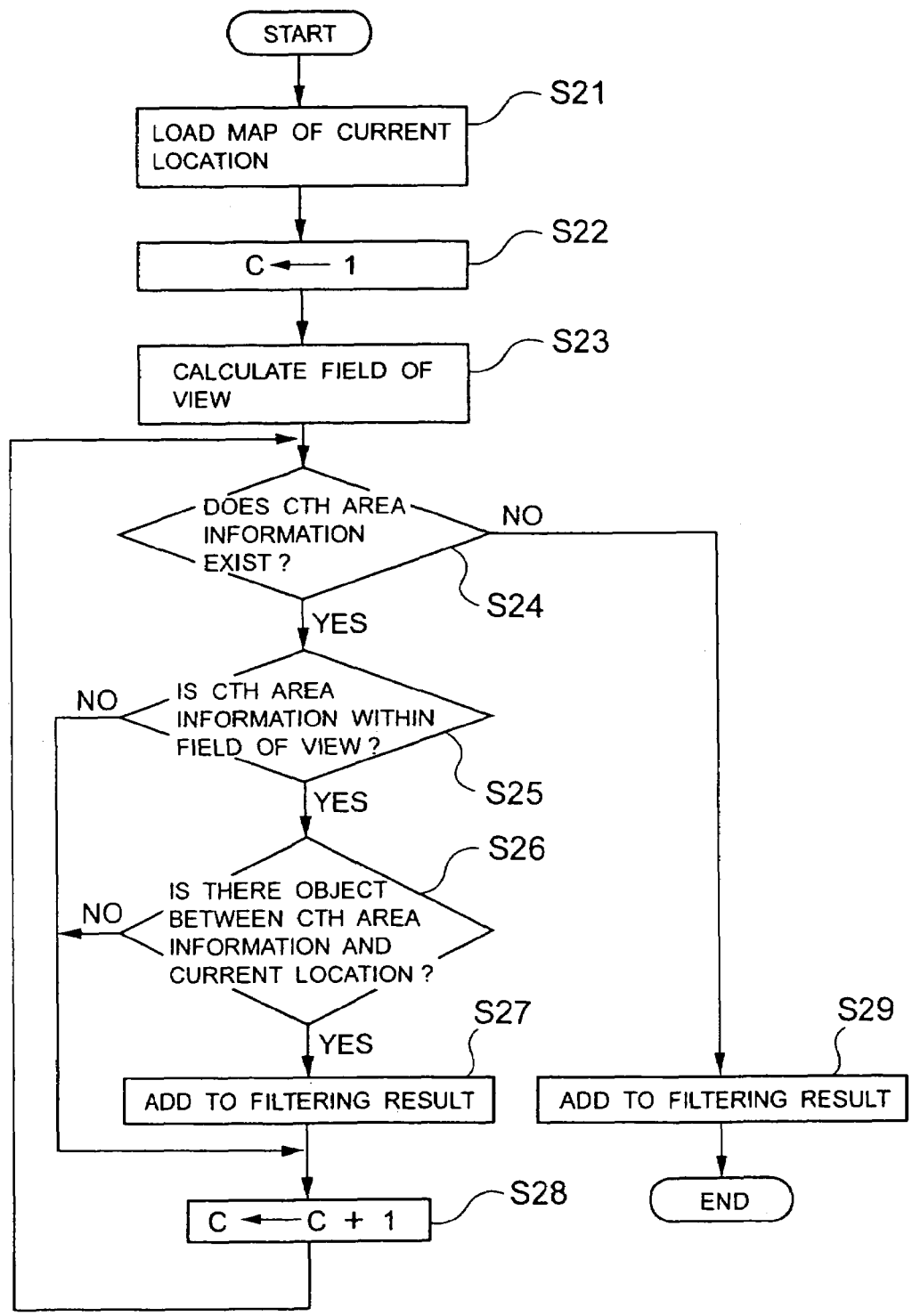
FIG. 8 is a flow chart showing a processing procedure of a field of view determining portion in FIG. 1.

FIG. 8 is a flow chart showing a processing procedure of the field of view determining portion 5. With reference to this FIG. 8, the processing procedure of the field of view determining portion 5 in response to a request from the position information filtering portion 4 will be explained.

As in the case of the processing carried out in step S12 of FIG. 5 above, the field of view determining portion 5 obtains map data of the periphery of the "current location", that is, map data 108 in a predetermined range from the "current location" from the map database 6 (step S21 in FIG. 8).

To carry out the following step on all records of the area information search result, the field of view determining portion 5 initializes a variable C which means the record currently being processed with "1" (C←1) (step S22 in FIG. 8).

The field of view determining portion 5 calculates the range (hereinafter referred to as "field of view") displayed to the 3D map display area 201 (step S23 in FIG. 8). In this calculation method, a certain angle range from the "current location" in the "current orientation" can be regarded as the field of view.

After this, if the Cth area information exists (step S24 in FIG. 8), the field of view determining portion 5 checks whether the Cth area information falls within the field of view or not (step S25 in FIG. 8). On the contrary, if the Cth area information does not exist (step S24 in FIG. 8), this means that records of all area information search result have been processed, the field of view determining portion 5 sends the filtering result stored in step S27 as the new area information search result to the position information filtering portion 4 using a response signal 107 (step S29 in FIG. 8) and finishes the processing.

If the Cth area information falls within the field of view, the field of view determining portion 5 checks whether Cth area information is actually visible from the "current location" or not (step S26 in FIG. 8). Furthermore, if the Cth area information does not fall within the field of view, the field of view determining portion 5 increments the value of the variable C by "1" (C←C+1) (step S28 in FIG. 8) and returns to step S24 above.

As a result of the check, if no object is found between the Cth area information and the "current location", the field of view determining portion 5 stores the Cth area information as the filtering result (step S27 in FIG. 8). If some object is found between the Cth area information and the "current location", the field of view determining portion 5 increments the value of the variable C by "1" (C←+C+1) (step S28 in FIG. 8) and returns to step S24 above.

Figure 9:
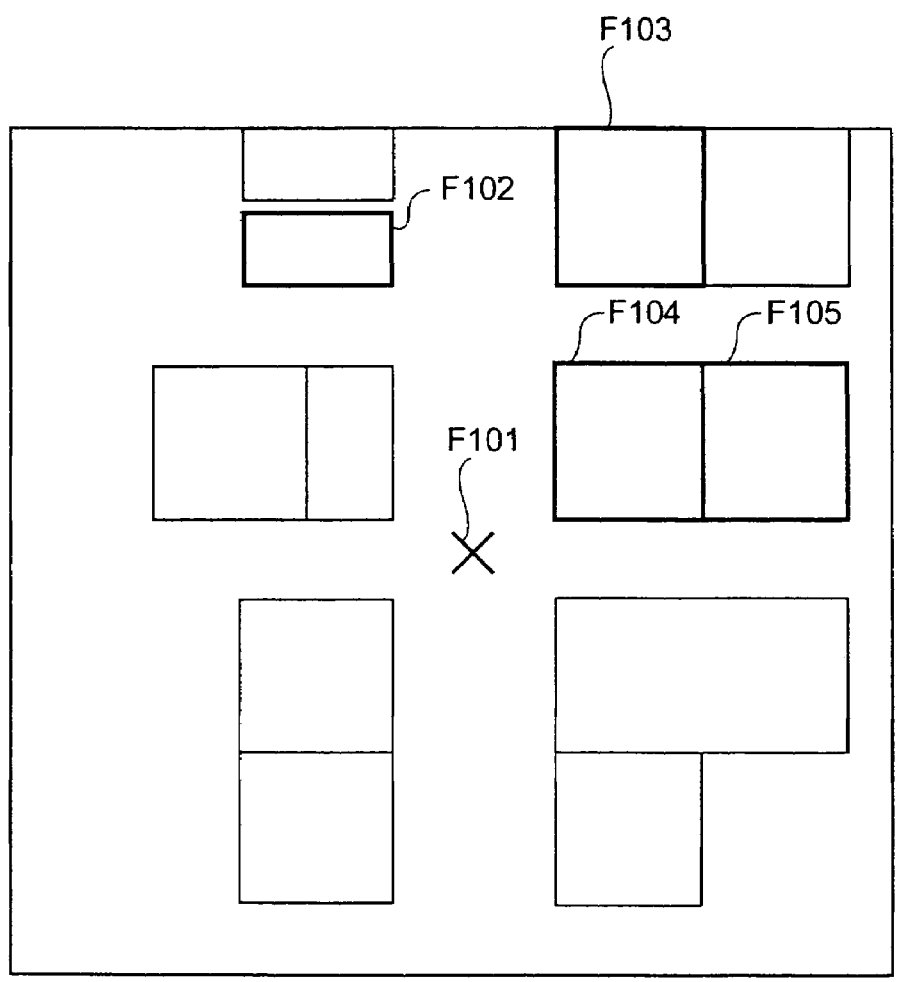
FIG. 9 is a schematic view showing a map data.
Figure 10:
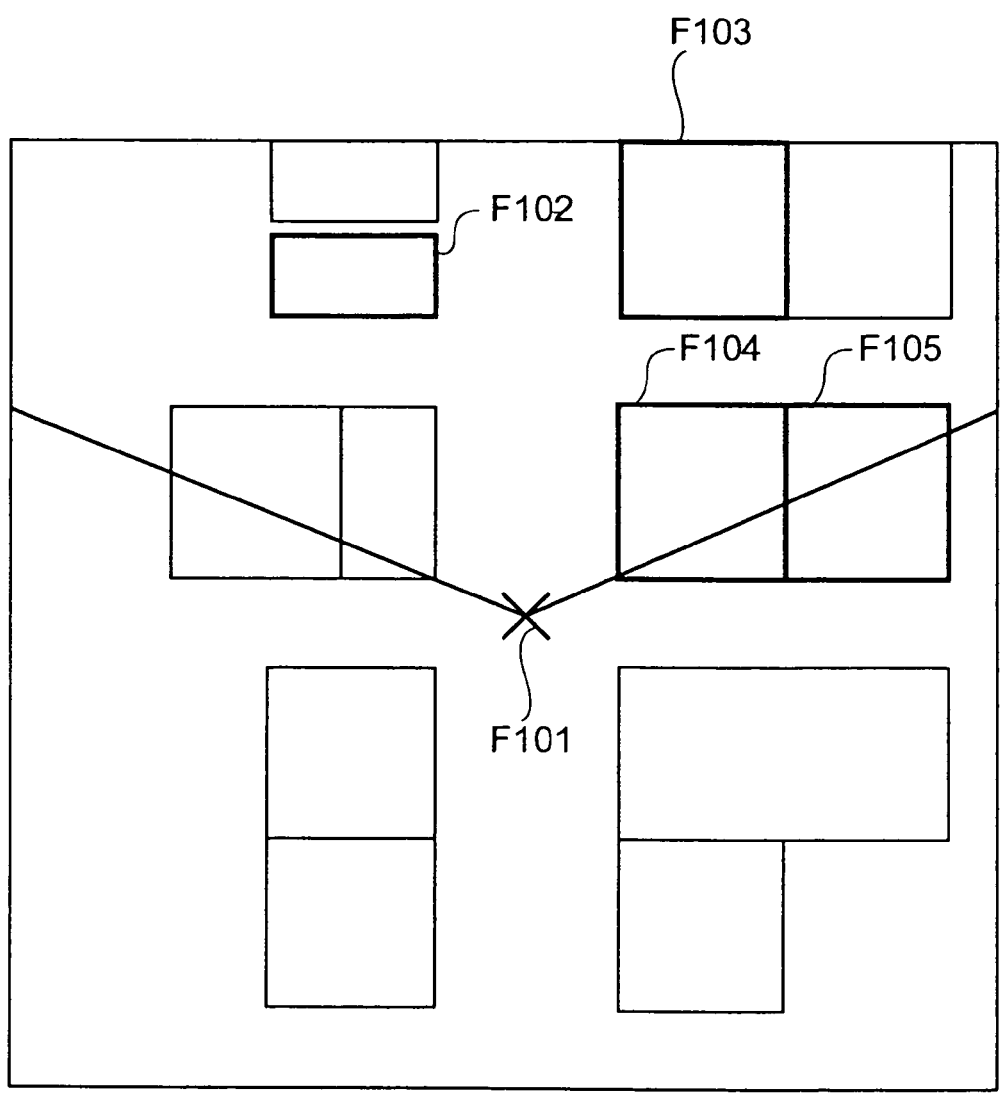
FIG. 10 is a schematic view showing a processing operation of the field of the view determining portion in FIG. 1.
Figure 11:
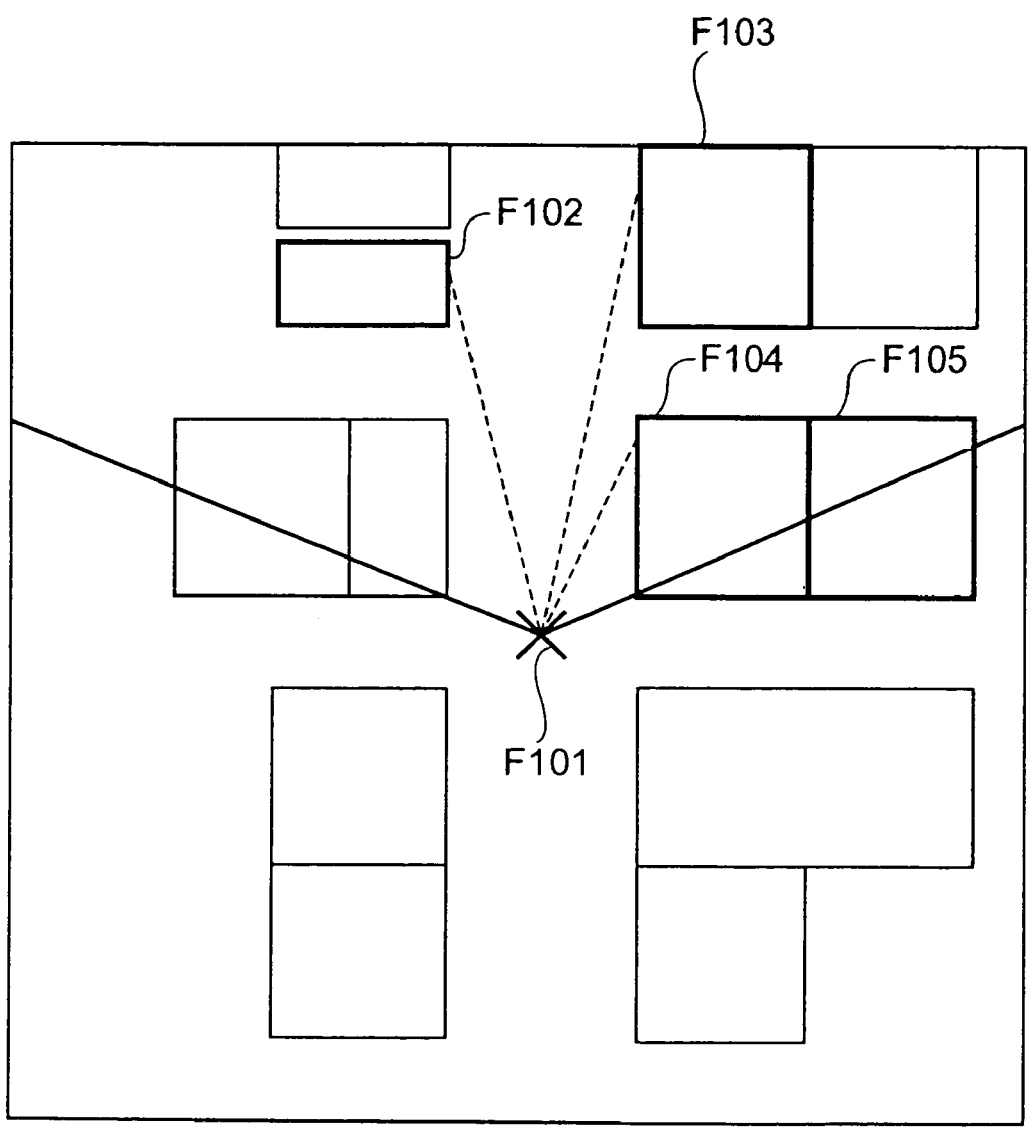
FIG. 11 is a schematic view showing a processing operation of the field of the view determining portion in FIG. 1.

FIG. 9 is a schematic view showing map data, FIG. 10 and FIG. 11 are schematic views showing a processing operation of the field of view determining portion 5 in FIG. 1, and FIG. 12 and FIG. 13 illustrate a filtering result of the first embodiment of the present invention. With reference to these FIG. 9 to FIG. 13, the processing procedure of the field of view determining portion 5 in response to the request from the position information filtering portion 4 will be explained more specifically.

The field of view determining portion 5 obtains the map data of the periphery of the "current location", that is, the map data 108 within a predetermined range from the "current location" from the map database 6. In this case, a commercially available map data can be used as the map data.

Now, to simplify explanations, simplified map data is shown in FIG. 9. The entire rectangle represents a map and rectangles inside represent buildings. Suppose the upward direction in the figure is north. In FIG. 9, "F101" denotes the "current location"; "F102", the "building at the location of the first record shown in FIG. 7 (record set for the "area information ID" of "1"); "F103", the "building at the location of the second record shown in FIG. 7 (record set for the "area information ID" of "3"); "F104", the "building at the location of the third record shown in FIG. 7 (record set for the "area information ID" of "4"); "F105", the "building at the location of the fourth record shown in FIG. 7 (record set for the "area information ID" of "6").

The field of view determining portion 5 calculates the field of view displayed to the 3D map display area 201. It is possible to calculate this field of view by regarding a certain angle range from the "current position" in the "current orientation" as the field of view. For example, if for the map data shown in FIG. 9, the "current orientation" is "north" and the angle of the field of view is "120 degrees", the section enclosed by the heavy line frame in FIG. 10 is the field of view.

When the Cth area information exists, the field of view determining portion 5 checks whether the Cth area information falls within the field of view or not and if Cth area information falls within the field of view, the field of view determining portion 5 checks whether the Cth area information is actually visible from the "current location" or not. In this case, the field of view determining portion 5 can check whether there are any objects such as buildings completely blocking between the Cth area information and the "current location".

For example, as shown in FIG. 11, auxiliary lines are drawn from the "current location" to the area contours on the map of the Cth area information at certain intervals and if at least one auxiliary line does not superimpose on the object, it is possible to determine that the object is actually visible from the "current location". However, this method is only an example and it is possible to process this with a more strict method.

As a result of the check, if there is no object between the Cth area information and the "current location", the field of view determining portion 5 stores the Cth area information as the filtering result. For example, when C=1, the 1st record shown in FIG. 7 is within the field of view as shown in FIG. 11 and there is no object between that area information and the "current location", and therefore the record with the "area information ID" of "1" is stored as the filtering result.

Furthermore, when filtering is performed one by one until C=4, as a search result of area information shown in FIG. 7, "F105" is deleted because there is an object between area information and the "current location" and finally the records whose "area information ID" is "1", "3" and "4" are stored as the filtering results (see FIG. 13).

Figure 14:
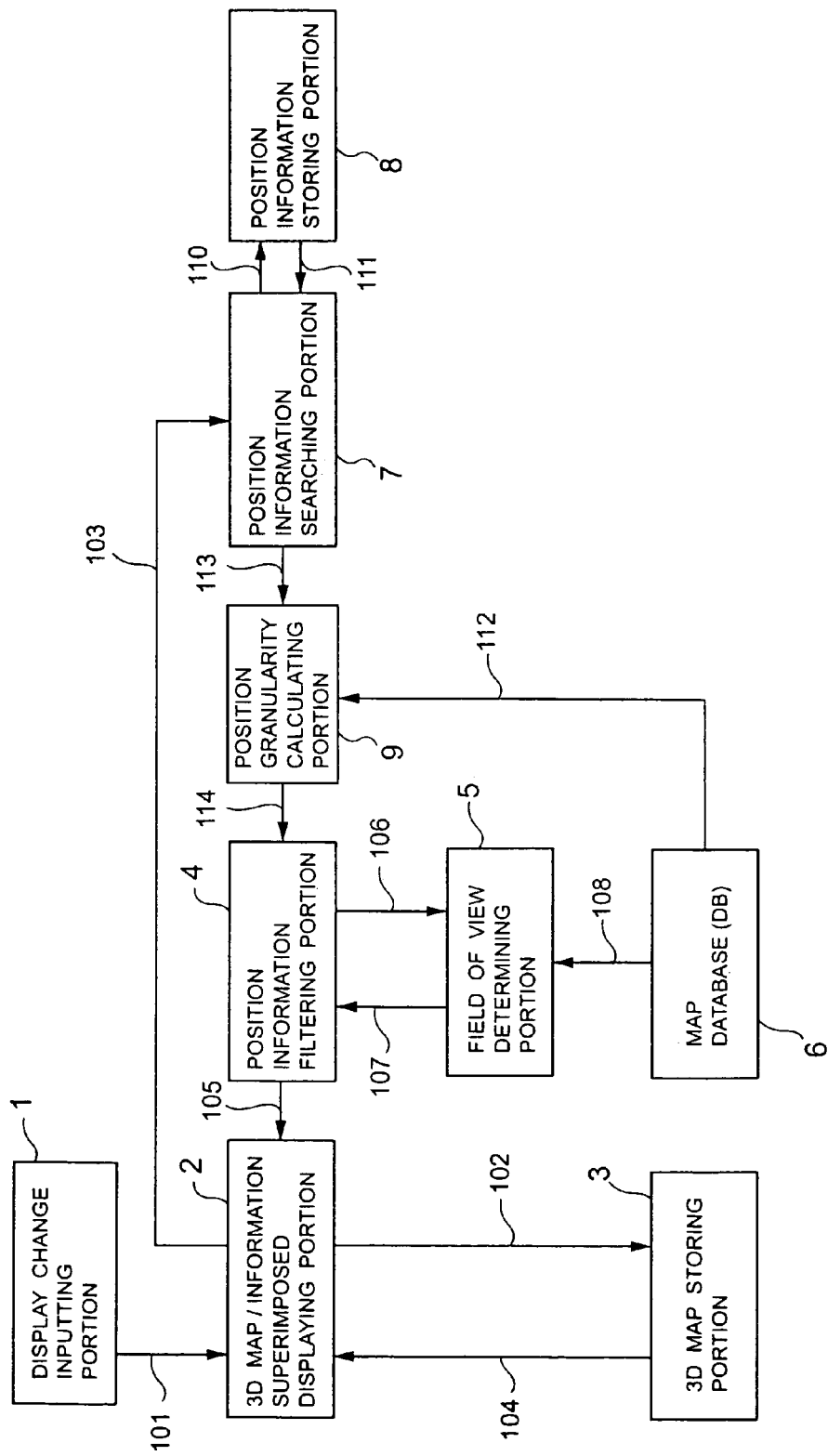
FIG. 14 is a block diagram showing a configuration of a position related information presentation system according to a second embodiment of the present invention.

FIG. 14 is a block diagram showing a configuration of a position related information presentation system according to a second embodiment of the present invention. In FIG. 14, the position related information presentation system according to the second embodiment of the present invention has the same configuration as that of the position related information presentation system according to the first embodiment of the present invention shown in FIG. 1 except in that it further includes position granularity calculating portion 9 for calculating granularity of an area indicating a division level of an area on the map covered by area information and the same components are assigned the same reference numerals. Operations of the same components are the same as those of the first embodiment of the present invention.

Figure 15:
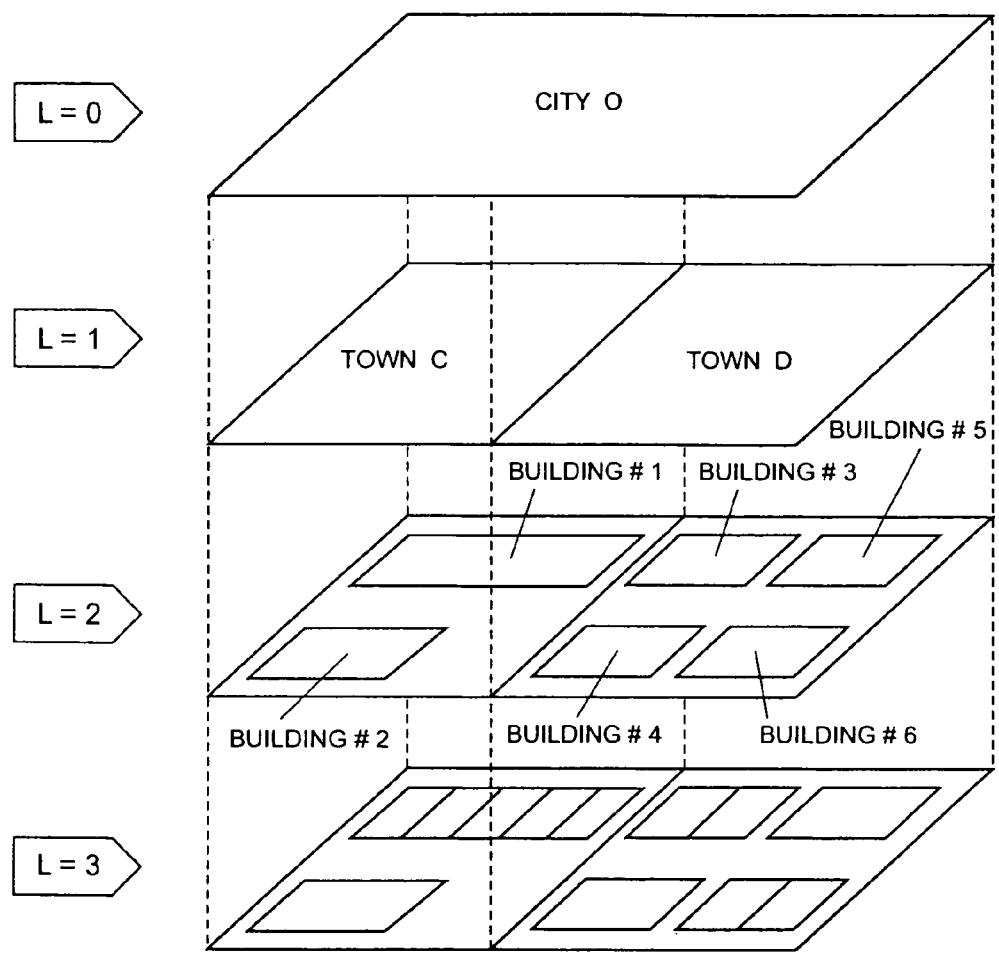
FIG. 15 is a schematic view showing a processing operation of the second embodiment of the present invention.

FIG. 15 is a schematic view showing a processing operation of the second embodiment of the present invention. With reference to this FIG. 15, the granularity of an area will be explained. Normally, when address information is expressed, address information is described hierarchically in descending order of the size of division, for example, prefecture level→ward, city, village level→town level→building level. FIG. 15 shows this schematically.

In FIG. 15, division levels are expressed with layers "0" to "3". For simplicity of explanations, in this embodiment, the ward, city, village level is classified as the roughest division, that is, division level 0 (hereinafter expressed as "L=0") and level 3 (hereinafter expressed as "L=3") which is a subdivision of the interior of a building as the most detailed division. The position granularity calculating portion 9 is means for determining the granularity of an area indicating the layer of a division level of an area on the map covered by the area information.

Figure 16:
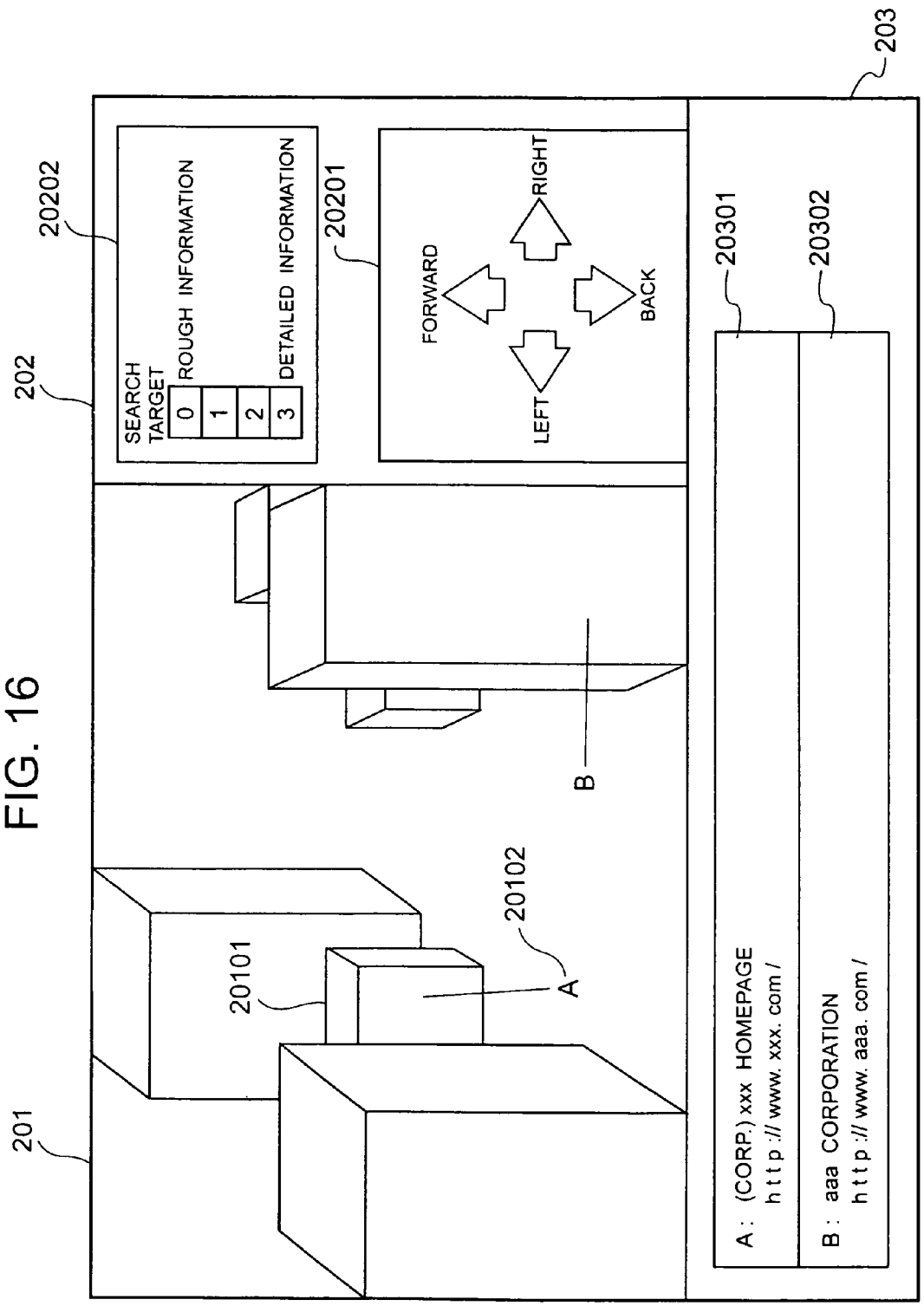
FIG. 16 illustrates an example of a display screen according to the second embodiment of the present invention.

FIG. 16 illustrates an example of a display screen according to the second embodiment of the present invention. FIG. 16 shows an example of a display screen shown by the 3d map/information superimposed displaying portion 2 and is the screen example shown in FIG. 2 plus an area 20202 that allows the user to input settings of a search target.

Suppose the user is allowed to enter four levels of information (0 to 3) from the roughest information such as information of an entire city down to the most detailed information such as information of a certain shop. Hereafter, this value will be referred to as a "level of details of current information".

With the addition of this area, the display change inputting portion 1 stores the level of details of current information selected by the user, and in step S1 in FIG. 3 above, also requests the 3D map/information superimposed displaying portion 2 for the level of details of current information as a parameter using a request signal 101. Furthermore, in step S11 in FIG. 5 above, upon requesting the position information searching portion 7 for a change of area information, the 3D map/information superimposed displaying portion 2 also sends the level of details of current information as a parameter using a request signal 103.

In step S12 in FIG. 5 above, the position information searching portion 7 is sending the area information search result, "current location" and "current orientation" to the position information filtering portion 4 using a response signal 109. This destination is changed to the position granularity calculating portion 9 and the level of details of current information is also sent as a parameter using a response signal 113. In response to this, the position granularity calculating portion 9 calculates the granularity of information of the area information search result as will be described later.

Figure 17:
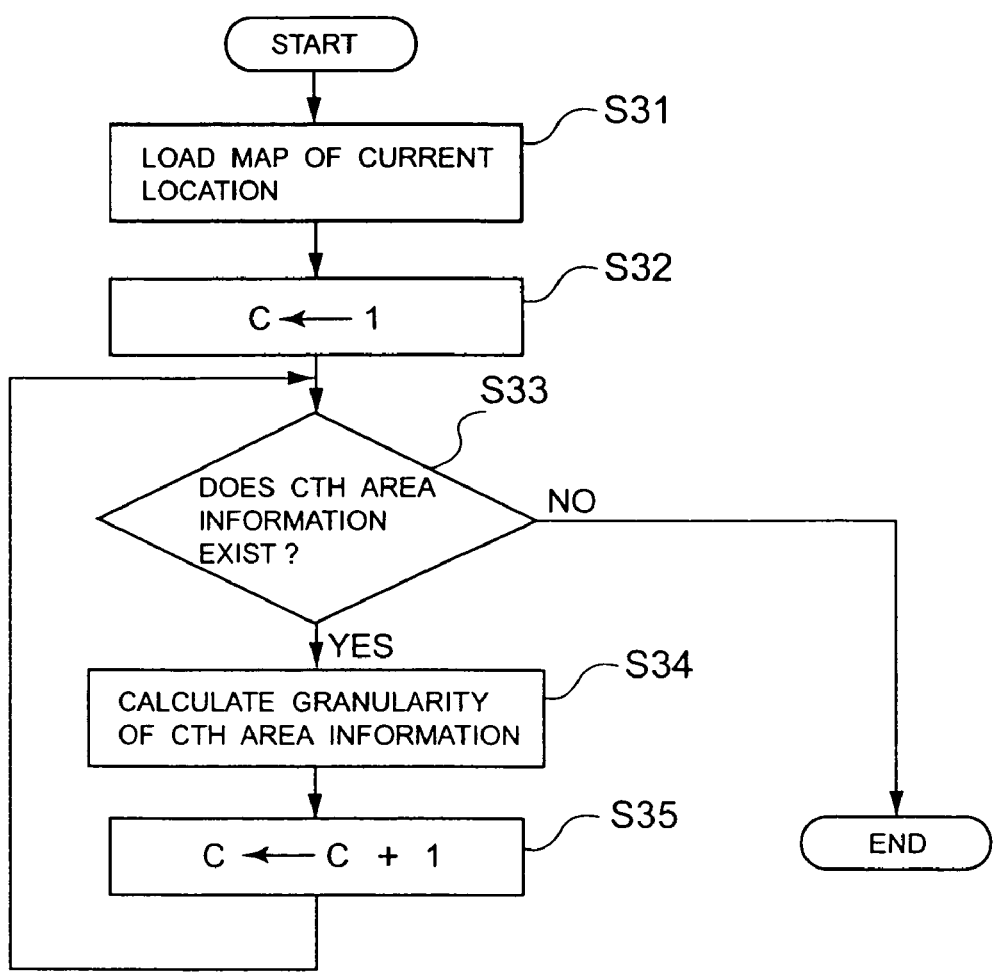
FIG. 17 is a flow chart showing a granularity calculation processing of the position granularity calculating portion in FIG. 14.

FIG. 17 is a flow chart showing the granularity calculation processing of the position granularity calculating portion 9 in FIG. 14. With reference to these FIG. 14 to FIG. 17, the granularity calculation processing of the position granularity calculating portion 9 will be explained.

The position granularity calculating portion 9 obtains map data 112 of the periphery of the "current location", that is, map data 112 within a predetermined range from the "current location" from the map database 6 in the same way as for the processing carried out in step S12 above (step S31 in FIG. 17).

The position granularity calculating portion 9 initializes variable C which means the record currently being processed with "1" (C←1) to process the following step on all records of the area information search result (step S32 in FIG. 17).

If the Cth area information exists (step S33 in FIG. 17), the position granularity calculating portion 9 calculates the granularity of the Cth area information (step S34 in FIG. 17), increments the value of the variable C by 1 (C←C+1) (step S35 in FIG. 17) and goes back to step S33.

If the Cth area information does not exist (step S33 in FIG. 17), this means that the records of the all area information search result has been processed, and the position granularity calculating portion 9 finishes this processing. The method of calculating the granularity of the above-described area information will be explained later.

Figure 18:
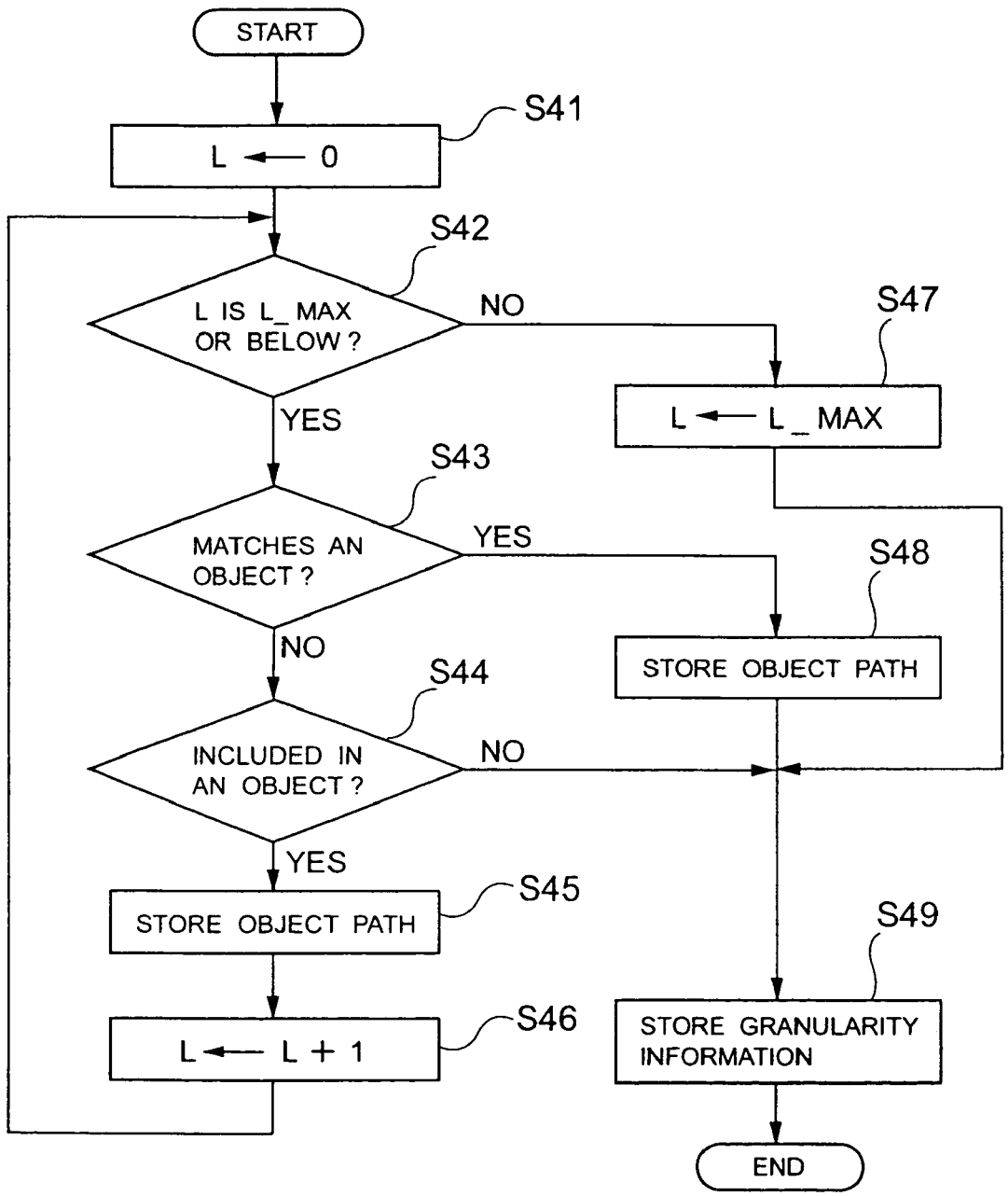
FIG. 18 is a flow chart showing a method of calculating granularity of area information using position granularity calculating portion in FIG. 14.

FIG. 18 is a flow chart showing a method of calculating granularity of area information using the position granularity calculating portion 9 in FIG. 14. With reference to these FIG. 14 and FIG. 18, the operation of the second embodiment of the present invention will be explained. First, the method of calculating granularity of the above-described area information will be explained. Hereafter, the Cth area information will be referred to as "focused area information".

To determine the granularity of area information starting from the roughest division level, the position granularity calculating portion 9 initializes the variable L to store the division level currently being focused with "0" (L←0) (step S41 in FIG. 18).

When the value of variable L is equal to or smaller than a maximum value (L_MAX) of the division level (step S42 in FIG. 18), the position granularity calculating portion 9 checks whether the area information matches a certain object or not and searches for an area on the map that the focused area information matches (step S43 in FIG. 18). If the area information matches no object, the position granularity calculating portion 9 searches for an area of the division level L on the map that includes the focused area information (step S44 in FIG. 18).

If the area of the division level L on the map that includes the focused area information is found, the position granularity calculating portion 9 stores a set of areas including the area of the focused area information (step S45 in FIG. 18). Hereafter, this will be referred to as an "object path" and the ID of the area will described delimited by commas.

If the value of variable L is not smaller than the maximum value (L_MAX) of the division level (step S42 in FIG. 18), the position granularity calculating portion 9 regards the value of variable L as L_MAX (step S47 in FIG. 18), adds a field for storing an object path and a field of the division level to which the area of the focused area information belongs to the area information search result (step S49 in FIG. 18) and finishes the processing. An intuitive meaning of this processing flow is that an object finer than the maximum division level (finest granularity) is handled as the maximum division level. Hereafter, the area information search result with these two fields added will be referred to as "expanded area information search result".

If the focused area information matches a certain object (step S43 in FIG. 18), the position granularity calculating portion 9 adds the area that matches the area of the focused area information to the object path (step S48 in FIG. 18), adds two fields, that is, a field to store the object path and a field at a lower division level to which the area of the focused area information belongs to the area information search result (step S49 in FIG. 18) and finishes the processing.

If the area of division level L on the map including the focused area information is not found (step S44 in FIG. 18), the position granularity calculating portion 9 adds the field to store the object path and the field of the division level to which the area of the focused area information belongs to the area information search result (step S49 in FIG. 18). An intuitive meaning of this processing flow is that because the area information not always completely matches an object on the map, processing of searching objects on the map with minimum granularity including the area information is carried out.

Figure 19:
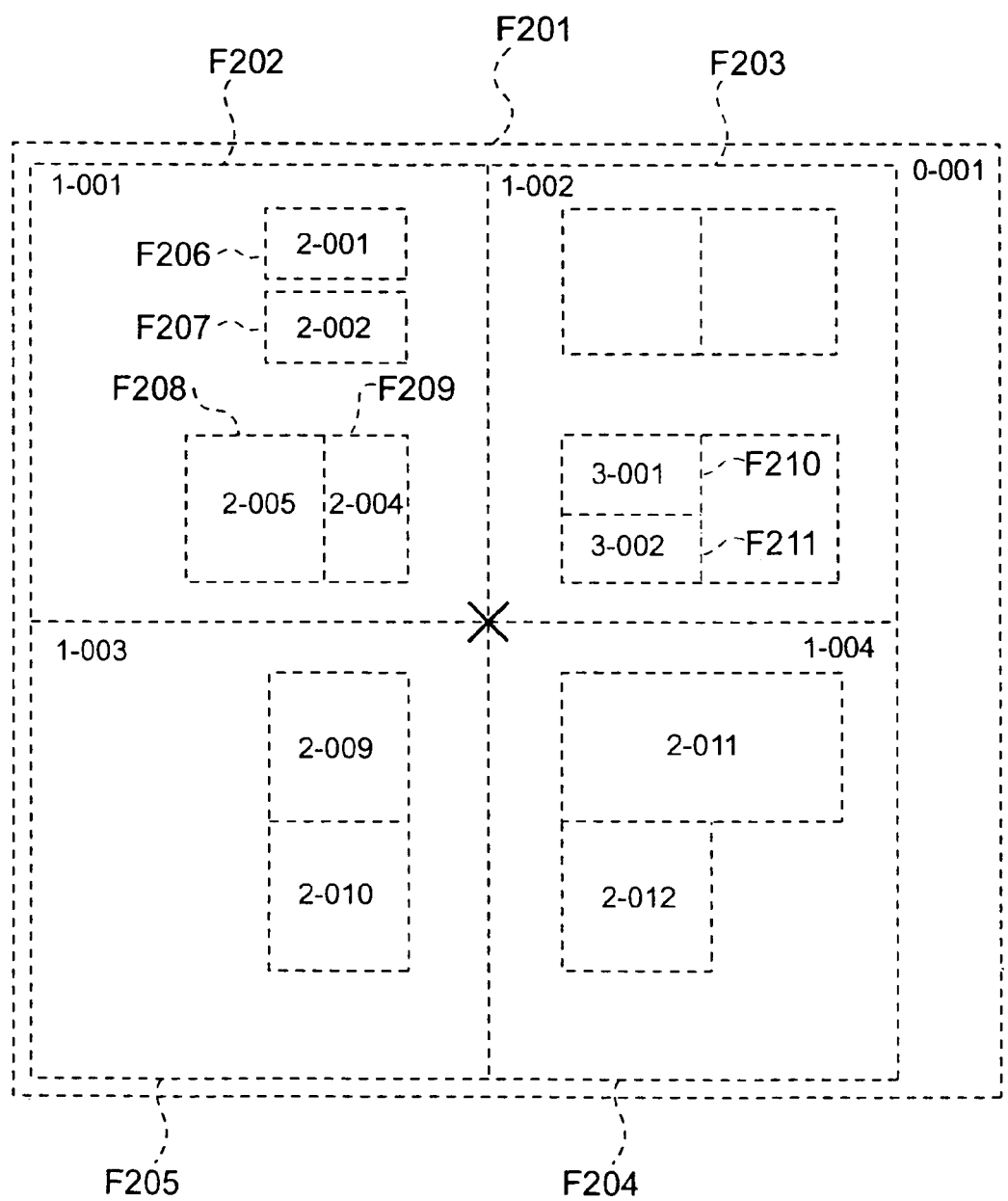
FIG. 19 is a schematic view showing the method of calculating granularity of area information using the position granularity calculating portion in FIG. 14.
Figure 20:
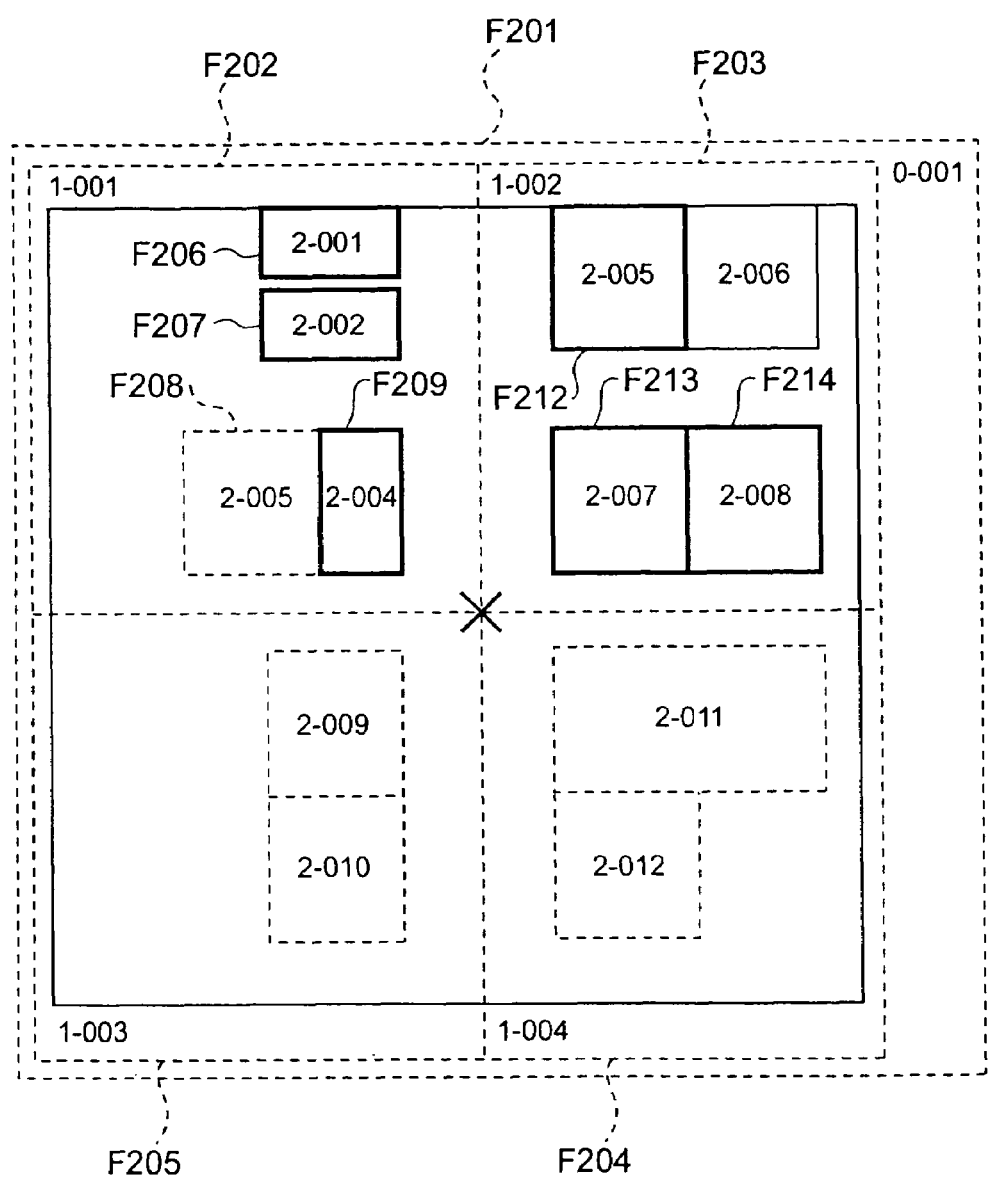
FIG. 20 shows the schematic view shown in FIG. 19 superimposed on the map data shown in FIG. 9.

FIG. 19 is a schematic view showing the method of calculating granularity of area information using the position granularity calculating portion 9 in FIG. 14, FIG. 20 shows the schematic view shown in FIG. 19 superimposed on the map data shown in FIG. 9 and FIG. 21 illustrates a filtering result according to the second embodiment of the present invention. With reference to these FIG. 14 and FIG. 19 to FIG. 21, an operation of the second embodiment of the present invention will be explained.

Normally, commercially available map software is also classified into division levels according to granularity and objects such as buildings exist at respective division levels. In the following explanations, the map divided into the division levels shown in FIG. 19 will be used.

"L=0" shows a city-level object. In the example shown in FIG. 19, the city-level object consists of a rectangle area F201 and suppose this area expresses a city. Each area is given an ID and area F201 is given an ID "0-001".

"L=1" shows town-level objects. In the example shown in FIG. 19, the town-level objects consist of rectangle areas F202 to F205 and suppose these areas express towns. Area F202 is given an ID "1-001", area F203 is given an ID "1-002", area F204 is given an ID "1-003" and area F205 is given an ID "1-004".

"L=2" shows building-level objects. In the example shown in FIG. 19, the building-level objects consist of rectangle areas F206 to F209 and suppose these areas express buildings. Area F206 is given an ID "2-001", area F207 is given an ID "2-002", area F208 is given an ID - "2-005" and area F209 is given an ID "2-004".

"L=3" shows objects inside a building. In the example shown in FIG. 19, these objects consist of rectangle areas F210 and F211 and suppose these areas express the interior of buildings. Area F210 is given an ID "3-001" and area F211 is given an ID "3-002".

The position granularity calculating portion 9 searches for an area on the map at the division level L that the focused area information matches and if the matched area is found, the position granularity calculating portion 9 adds the area that matches the area of the focused area information to the object path. For example, a case where the focused area information is the first record (area F102 in FIG. 9) shown in FIG. 7 and "L=0" will be explained. FIG. 20 shows the map data shown in FIG. 9 superimposed on the map shown in FIG. 19 and area F102 in FIG. 9 which is the focused area information is area F207 in FIG. 20.

Since "L=0", the area at this division level is only area F201. Area F207 does not match area F201, and therefore the position granularity calculating portion 9 searches for an area at division level L on the map including the focused area information.

If the area is found, the position granularity calculating portion 9 stores the object path and if the area is not found, the position granularity calculating portion 9 adds, as shown in FIG. 21, field T205 that stores the object path and field T206 of the division level to which the area of the focused area information belongs to the area information search result shown in FIG. 7.

In the above-described example, since area F207 is included in area F201, the position granularity calculating portion 9 stores a set of areas including the area of the focused area information, that is, the object path. In the above-described example, since area F207 is included in area F201, the object path of area F207 becomes "0-001" which is the ID of area F201.

In the example of area F207, if "L=0", area F207 is included in area F201, if "L=1", area F207 is included in area F202, if "L=2", the area matches area F207, and therefore the object path becomes "0-001, 1-001, 2-001" and "0-001, 1-001, 2-001" is stored in field T205. Furthermore, to process this step with "L=2", "2" is stored in field T206 (see FIG. 21).

When the granularity is calculated, the position granularity calculating portion 9 sends the expanded area information search result, "current location", "current orientation" and level of details of current information to the position information filtering portion 4 using a response signal 114.

Upon receiving this, the position information filtering portion 4 carries out area information filtering processing. To carry out this area information filtering processing, the position information filtering portion 4 requests the field of view determining portion 5 for the area information filtering processing using a request signal 106 first.

In this case, in addition to the expanded area information search result, "current location" and "current orientation", the position information filtering portion 4 sends the level of details of the current information to the field of view determining portion 5 as a parameter.

Figure 22:
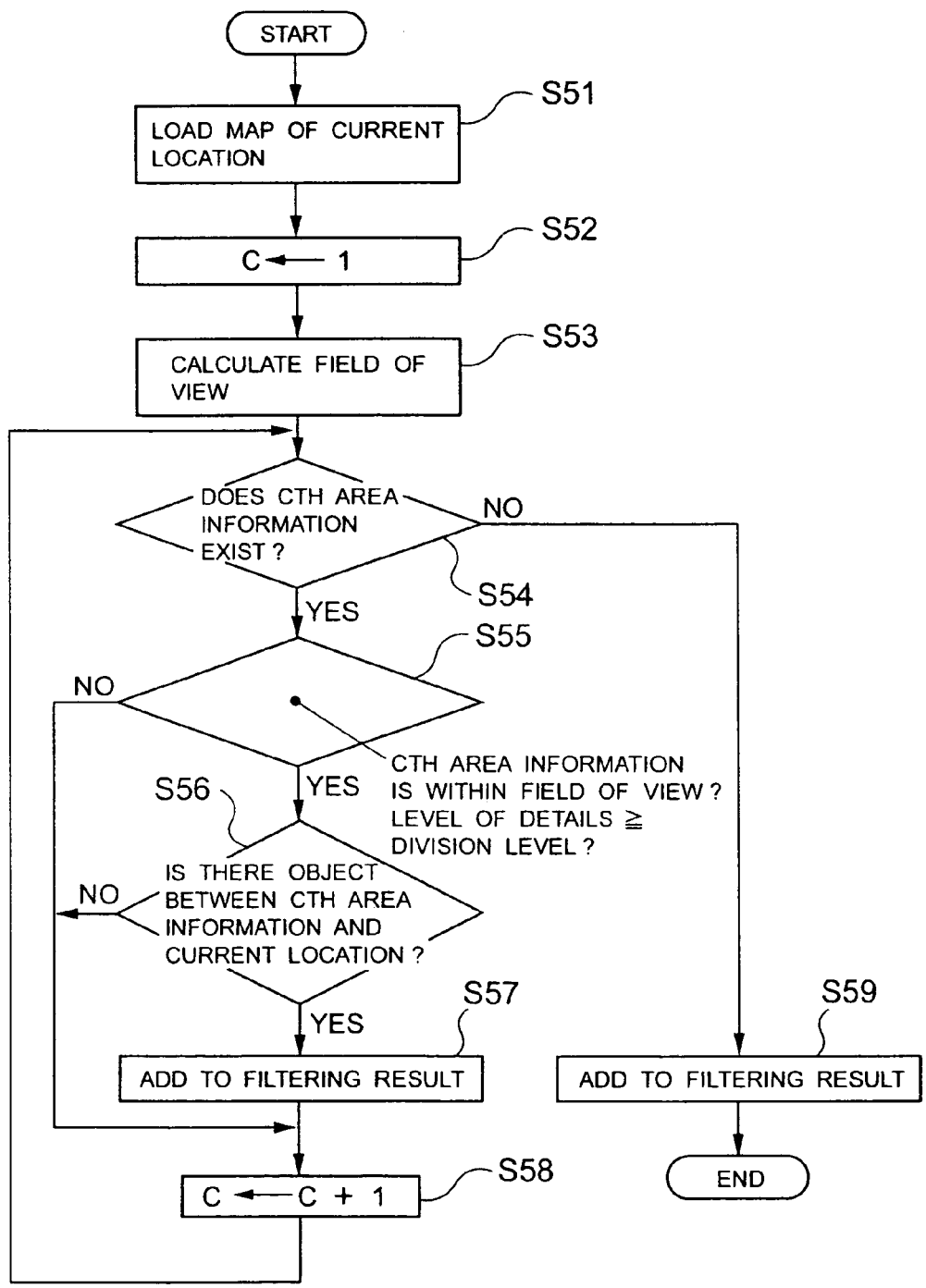
FIG. 22 is a flow chart showing a processing procedure of the field of view determining portion in FIG. 14.

FIG. 22 is a flow chart showing a processing procedure of the field of view determining portion 5 in FIG. 14. In FIG. 22, step S55 is different compared to the processing operation in the first embodiment of the present invention shown in FIG. 8.

The field of view determining portion 5 checks two items, that is, whether the Cth area information is within the field of view or not and whether the division level of the Cth area information (field T206) is equal to or below the current level of details or not (step S55 in FIG. 22). If both items are satisfied, step S56 is processed and if the Cth area information is not within the field of view, step S58 is processed.

By the way, other processing operations (steps S51 to S54, S56 to S59) are the same as the processing operations (step S21 to S24, S26 to S29) according to the first embodiment of the present invention shown in FIG. 8. Modifying this way makes it possible to display area information that matches the conditions of search targets in the area information link display area 203.

Figure 23:
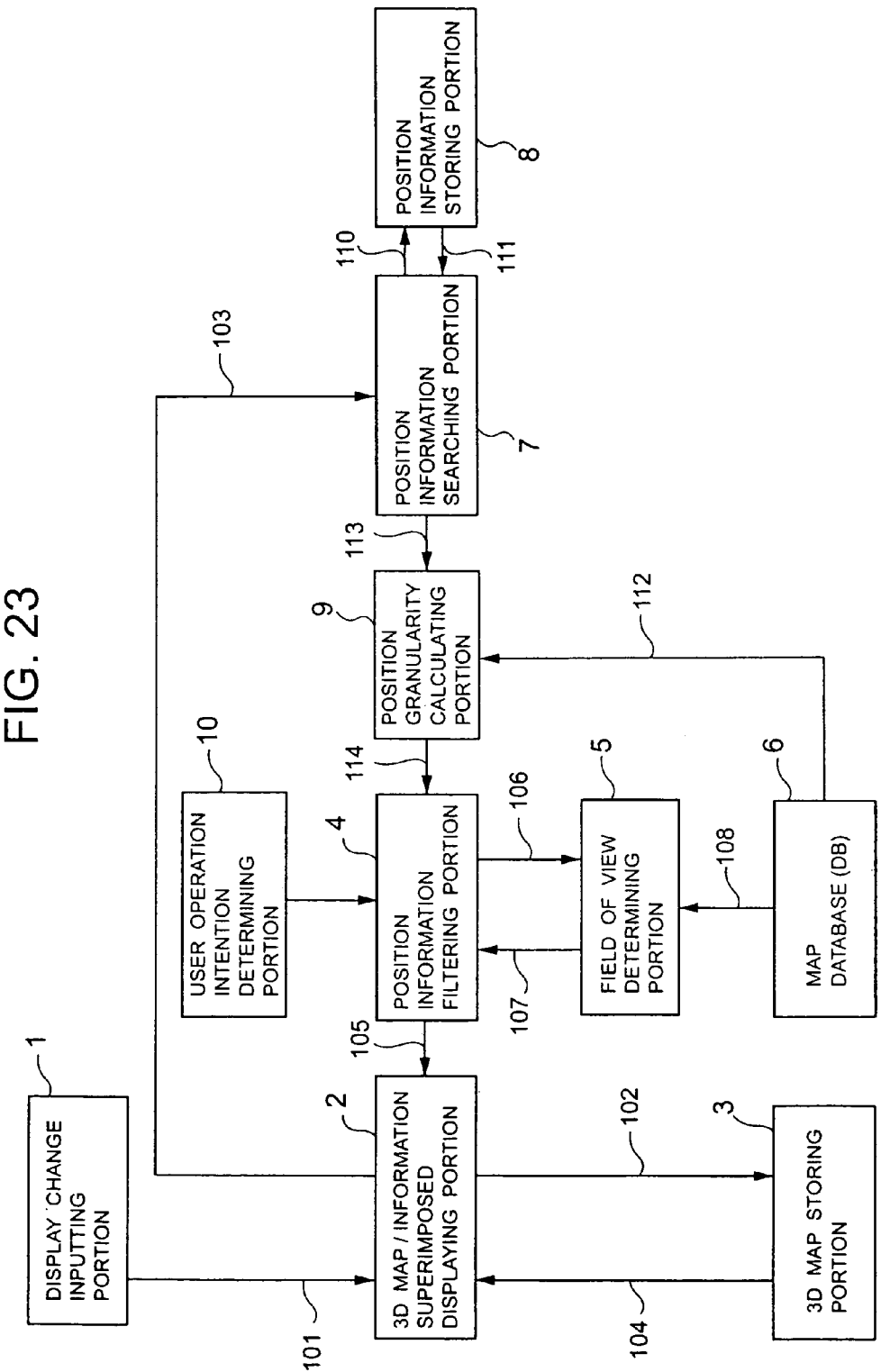
FIG. 23 is a block diagram showing a configuration of a position related information presentation system according to a third embodiment of the present invention.

FIG. 23 is a block diagram showing a configuration of a position related information presentation system according to a third embodiment of the present invention. In FIG. 23, the position related information presentation system according to the third embodiment of the present invention has the same configuration as that of the second embodiment of the present invention shown in FIG. 14 except the addition of user operation intention determining portion 10 for estimating area information requested by the user judging from the user operations carried out using the display change inputting portion 1, and the same components are assigned the same reference numerals. Operations of the same components are the same as those of the second embodiment of the present invention.

Figure 24:
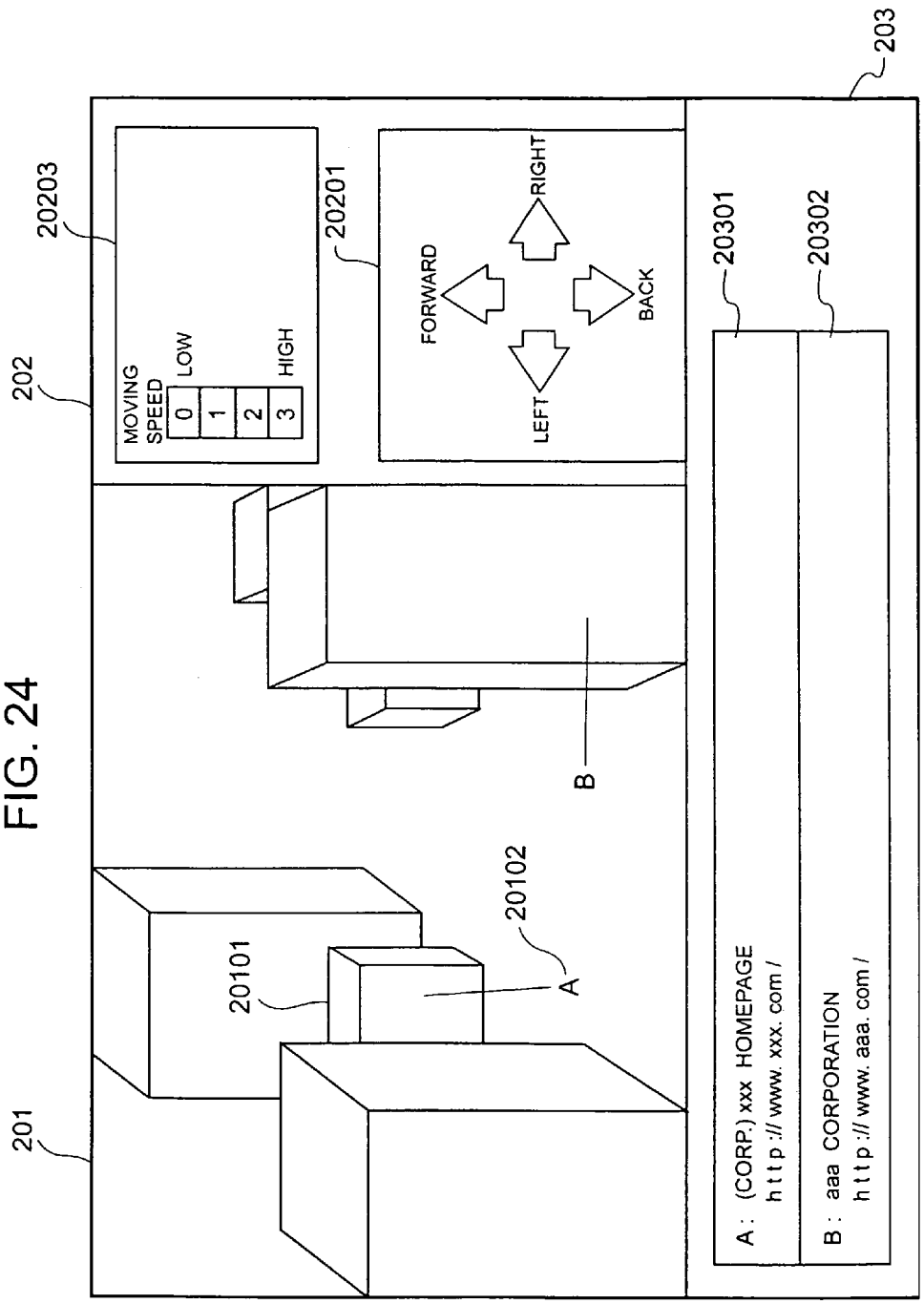
FIG. 24 illustrates an example of a display screen according to the third embodiment of the present invention.

FIG. 24 illustrates an example of a display screen according to the third embodiment of the present invention. FIG. 24 shows an example of the display screen displayed by the 3D map/information superimposed displaying portion 2 and this display screen consists of the screen example shown in FIG. 2 plus an additional area 20203 that allows the user to set not only the direction but also the speed at which the user moves forward.

In the display screen shown in FIG. 16, the user explicitly specifies the conditions of search targets in the area 20202, but these conditions need not be entered and therefore deleted because the user operation intention determining portion 10 automatically estimates those conditions. With the display screen shown in FIG. 24, the user can input the speed in four stages of "0" to "3" in the area 20203. Hereafter, this value will be referred to as "current moving speed".

With the addition of this area, the display change inputting portion 1 stores the current moving speed selected by the user and also sends, in step S1 in FIG. 3 above, the current moving speed as a parameter to the 3D map/information superimposed displaying portion 2 using a request signal 101 to request for the content of the user operation. While the second embodiment of the present invention also sends the level of details of the current information as a parameter, the third embodiment of the present invention does not send it. Hereafter, no parameters of the level of details of the current information will be sent.

In step S11 in FIG. 5, when the 3D map/information superimposed displaying portion 2 requests the position information searching portion 7 to change the area information using a request signal 103, the 3D map/information superimposed displaying portion 2 also sends the current moving speed as a parameter.

In step S12 in FIG. 5, the position information searching portion 7 also sends the current moving speed to the position granularity calculating portion 9 as a parameter using a response signal 113. In step S49 in FIG. 18, the position granularity calculating portion 9 also sends the current moving speed to the position information filtering portion 4 as a parameter using a response signal 114. Upon reception of this response signal, the position information filtering portion 4 performs area information filtering processing.

In the second embodiment of the present invention, this processing is carried out through the processing flow shown in FIG. 22, but in the third embodiment of the present invention, the user operation intention determining portion 10 estimates which division level of information is requested by the user judging from the current replay speed first and then executes the processing flow shown in FIG. 22.

Figure 25:
FIG. 25 illustrates a table in the user operation intention determining portion in FIG. 23.

FIG. 25 illustrates a table in the user operation intention determining portion 10 in FIG. 23. In FIG. 25, this table consists of field T301 that indicates the current moving speed and field T302 that indicates the division level to be displayed to the area information link display area 203 of the display screen shown in FIG. 24.

The intuitive meaning of this table is to enable the system to display rough information when the user is moving rapidly and detailed information when the user is moving slowly.

The position information filtering portion 4 stores, by means of the user operation intention determining portion 10, value 115 in field T302 of the record where the value of the current moving speed matches the value in field T301 as the value of the level of details of the current information. For example, in the example shown in FIG. 25, when the speed in field T301 is "2", the value of the level of details of the current information in field T302 is "1".

The position information filtering portion 4 requests the field of view determining portion 5 for area information filtering processing using a request signal 106. The processing procedure by the field of view determining portion 5 in response to this request is the same as the processing operation by the second embodiment of the present invention shown in FIG. 22.

Modifying the system in this way makes it possible to selectively display area information that is appropriate to the way the 3D map moves judging from the way the 3D map moves without the need for the user to particularly specify some area information search conditions.

Figure 26:
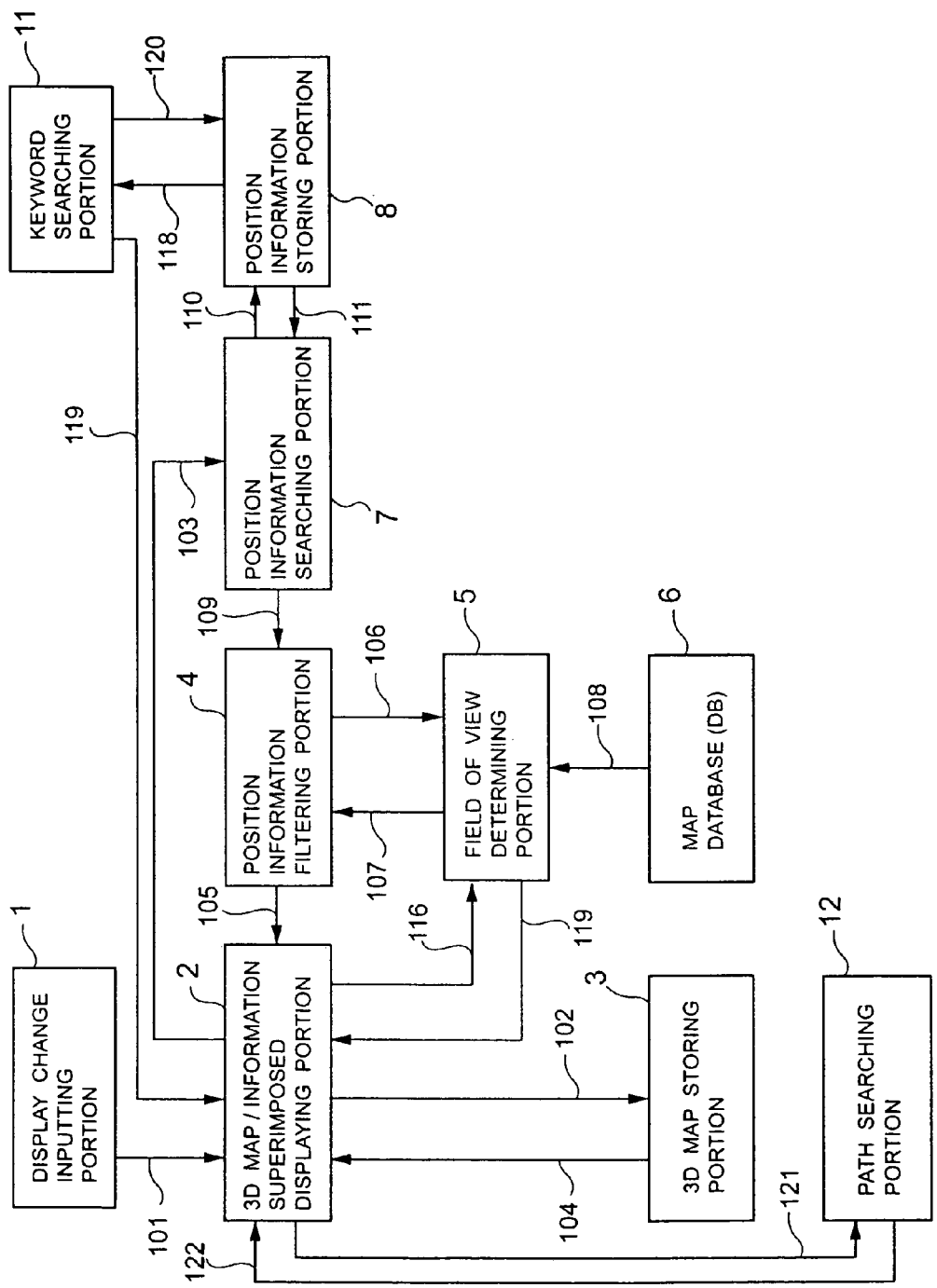
FIG. 26 is block diagram showing a configuration of a position related information presentation system according to a fourth embodiment of the present invention.

FIG. 26 is block diagram showing a configuration of a position related information presentation system according to a fourth embodiment of the present invention. In FIG. 26, the position related information presentation system according to the fourth embodiment of the present invention has the same configuration as that of the position related information presentation system according to the first embodiment of the present invention shown in FIG. 1 except the additions of keyword searching portion 11 for searching area information by entering keywords and path searching portion 12 for searching a path from the current location to a place related to a search result, and the same components are assigned the same reference numerals. Operations of the same components are the same as those in the first embodiment of the present invention.

Unlike the first, second and third embodiments of the present invention whereby the user acquires area information while walking around on a 3D map, this embodiment presupposes a method of use whereby the user searches for area information using keywords, and then walks around and moves to a place related to the search result on the 3D map.

Figure 27:
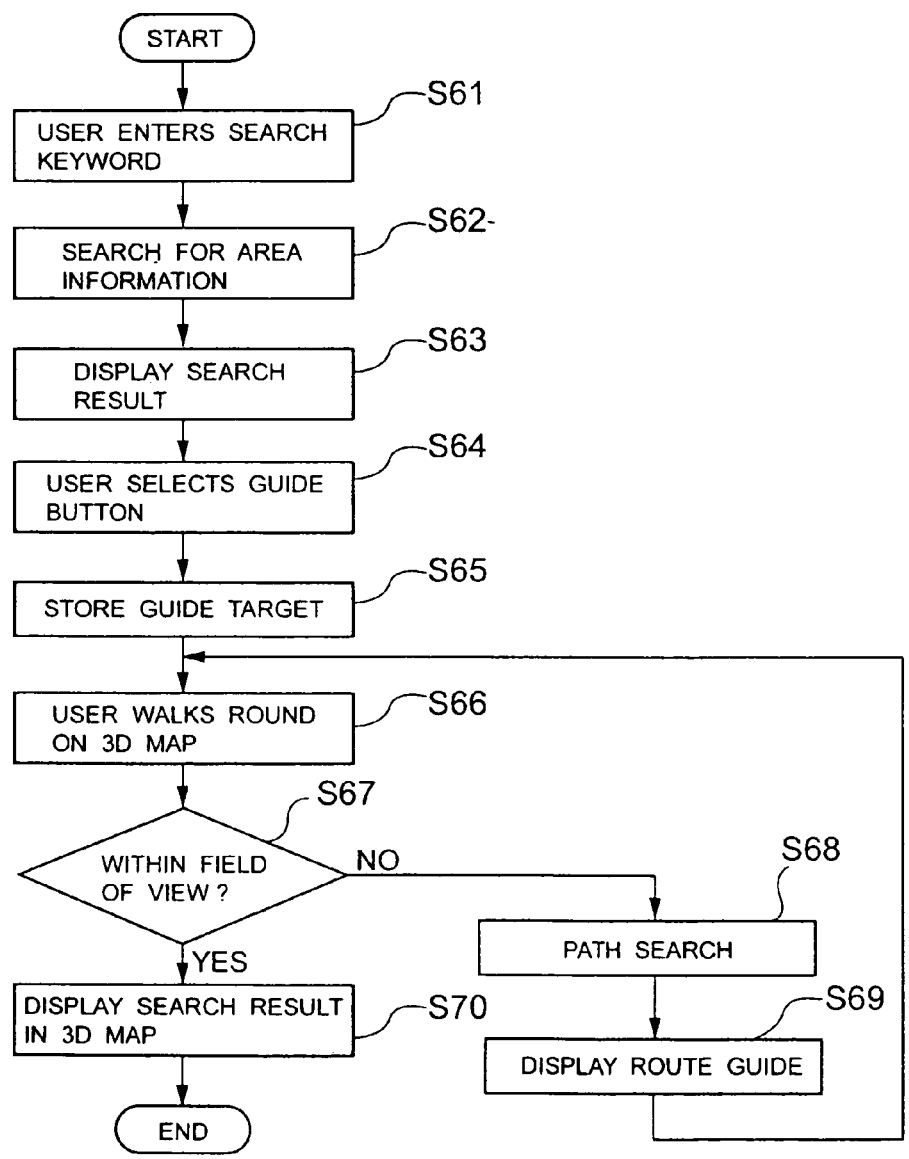
FIG. 27 is a flow chart showing a processing operation according to the fourth embodiment of the present invention.
Figure 28:
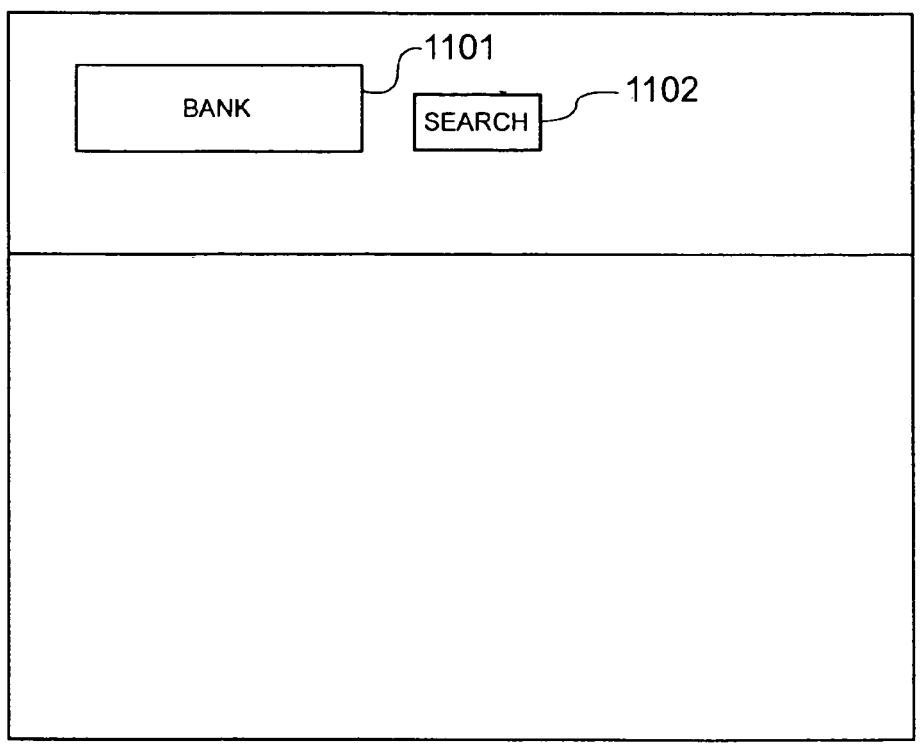
FIG. 28 shows an example of an input screen of keyword searching portion in FIG. 26.
Figure 30:
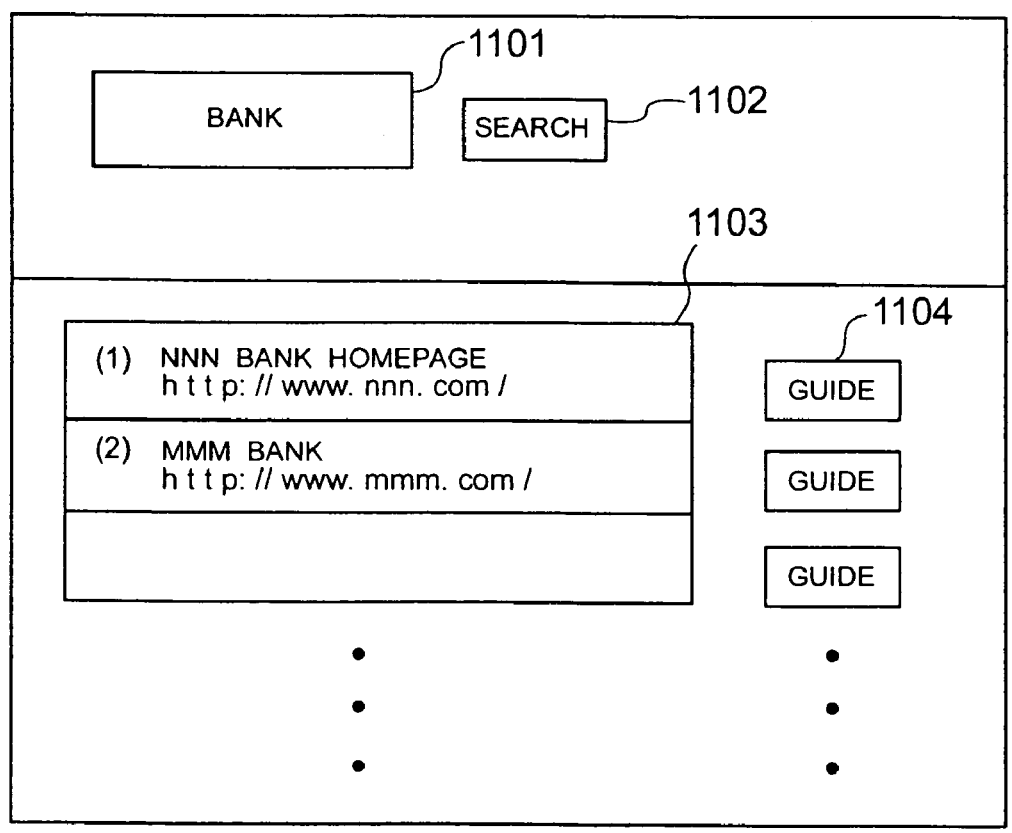
FIG. 30 illustrates a display example of a search result of the keyword searching portion in FIG. 26.
Figure 32:
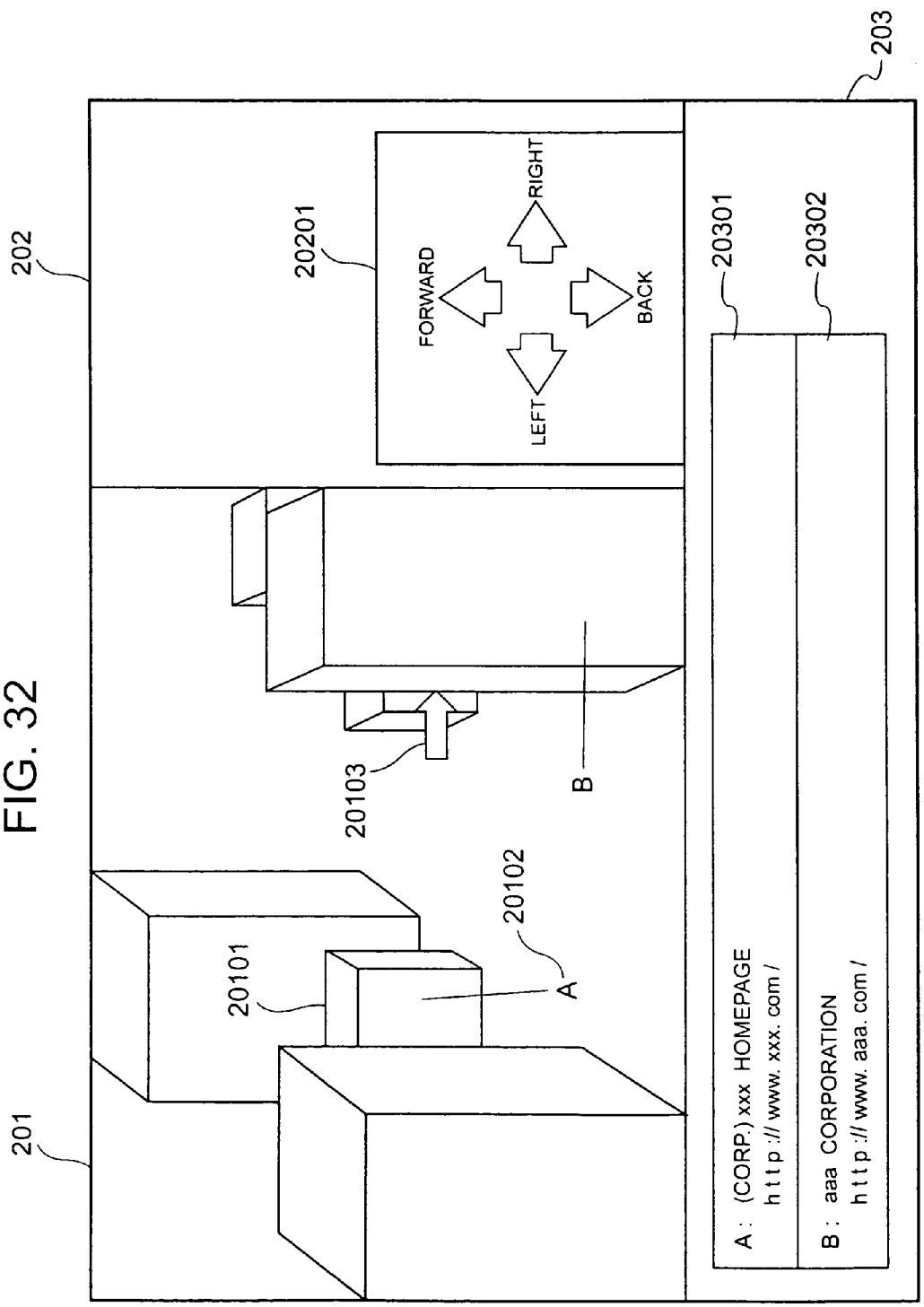
FIG. 32 illustrates an example of a display screen according to the fourth embodiment of the present invention.
Figure 33:
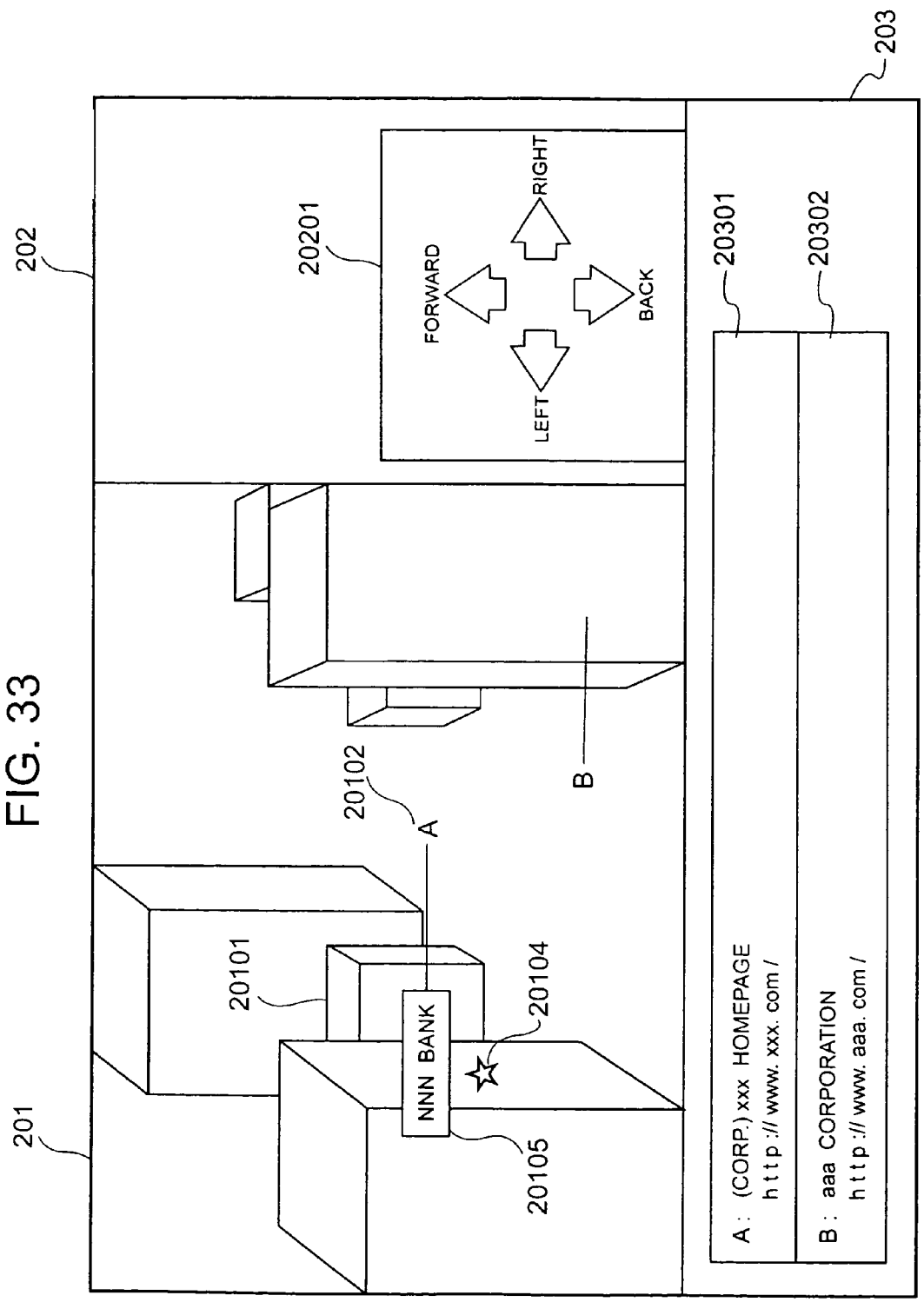
FIG. 33 illustrates an example of a display screen according to the fourth embodiment of the present invention.

FIG. 27 is a flow chart showing a processing operation according to the fourth embodiment of the present invention, FIG. 28 shows an example of an input screen of the keyword searching portion 11 in FIG. 26, FIG. 29 shows an example of a search result of the keyword searching portion 11 in FIG. 26, FIG. 30 illustrates a display example of a search result of the keyword searching portion 11 in FIG. 26, FIG. 31 illustrates a search result of the keyword searching means in FIG. 26 and FIG. 32 and FIG. 33 illustrate examples of a display screen according to the fourth embodiment of the present invention. With reference to these FIG. 26 to FIG.

33, a processing operation of the fourth embodiment of the present invention will be explained.

The user searches information of interest using keywords using the keyword searching portion 11 (step S61 in FIG. 27). A screen example of the keyword searching portion 11 is shown in FIG. 28. In FIG. 28, reference numeral 1101 denotes a keyword input field [in FIG. 28, the user is trying to search for information on a "bank"] and reference numeral 1102 denotes a search button.

When the user presses (clicks on) the search button 1102, the keyword searching portion 11 requests the position information storing portion 8 to conduct a search using the search keyword 1101 as a parameter through a request signal 120.

The position information storing portion 8 searches for a record including the search keyword sent as a parameter in field T203 with the title shown in FIG. 6 (step S62 in FIG. 27). FIG. 29 shows the result of the search with the search keyword "bank" in field T203 of the title shown in FIG. 6. However, this search method is just an example, and it is also possible to consider the entire page shown by field T202 of the URL shown in FIG. 6 as the search target with the search keyword.

The position information storing portion 8 returns the search result shown in FIG. 29 to the keyword searching portion 11 using a response signal 118. The keyword searching portion 11 displays the search result of the position information storing portion 8 (step S63 in FIG. 27). FIG. 30 shows an example of the screen that displays this search result.

In FIG. 30, reference numeral 1103 denotes a search result display field and reference numeral 1104 denotes a guide button to move to a place related to the search result. In FIG. 30, the search result display field 1103 shows field T203 of the title of the search result shown in FIG. 7 on the first row and field T202 of the URL on the second row. Furthermore, the keyword searching portion 11 displays a guide button 1104 for every search result.

The user presses (clicks on) the guide button 1104 of the search result from among the search results for which the user wants a guide in the 3D map (step S64 in FIG. 27). For simplification of explanations, this embodiment supposes that the user presses the guide button 1104, but the user need not always press the guide button 1104. For example, the user can return to step S61 above and do a search over again or finish the keyword search.

The keyword searching portion 11 sends the search result 119 of the search for which the guide button 1104 is pressed (see FIG. 31) to the 3D map/information superimposed displaying portion 2. The 3D map/information superimposed displaying portion 2 stores the search result 119 sent from the keyword searching portion 11 as a guide target for the user (hereinafter this data will be used as a guide target) (step S65 in FIG. 27).

The user walks around on the 3D map using the same method as those in the above-described first, second and third embodiments of the present invention (step S66 in FIG. 27). The 3D map/information superimposed displaying portion 2 displays the 3D map according to the processing flow shown in FIG. 3 and carries out processing to show a guide every time this processing flow ends.

The 3D map/information superimposed displaying portion 2 sends the current location and guide target location T204 shown in FIG. 31 to the field of view determining portion 5 using a request signal 116 so that the field of view determining portion 5 determines whether the guide target is within the field of view or not.

The field of view determining portion 5 determines whether the guide target is within the field of view or not using the method explained in the first embodiment of the present invention and sends the result to the 3D map/information superimposed displaying portion 2 using a response signal 117.

If this reply is TRUE (the guide target is within the field of view) (step S67 in FIG. 27), which means that the user has reached the target point, the 3D map/information superimposed displaying portion 2 shows that the target point is within the field of view (step S70 in FIG. 27) (see FIG. 33).

On the other hand, if this reply is FALSE (the guide target is not within the field of view) (step S67 in FIG. 27), which means that the user has not reached the target point, the 3D map/information superimposed displaying portion 2 sends the current location and guide target location T204 shown in FIG. 31 to the path searching portion 12 using a request signal 121 to find the direction in which the user should move forward to reach the guide target location from the current location (step S68 in FIG. 27).

The path searching portion 12 is the means for calculating the shortest path when given two points and any well-known means can be used and mounted as the path searching portion 12. The path searching portion 12 in this embodiment calculates the path between the two points, the current location and guide target location T204 and sends one of "right" "left", "forward" and "back" as the direction in which the user should move from the current location as a reply to the 3D map/information superimposed displaying portion 2 using a response signal 122.

The 3D map/information superimposed displaying portion 2 displays the path which the user should currently follow (step S69 in FIG. 27) (see FIG. 32). In FIG. 32, an arrow 20103 in the center of the screen indicates the direction that the user should follow and in this case, it means that the user should goes rightward to reach the guide target. However, the user need not always move in the direction indicated by the arrow 20103, but the user can move in any direction.

Since the system of this embodiment always calculates the path from the current location to the guide target, the user can deviate from the shortest path. In FIG. 33, reference numeral 20104 denotes an icon indicating the target point and reference numeral 20105 denotes title T203 of the target point shown in FIG. 31.

Figure 34:
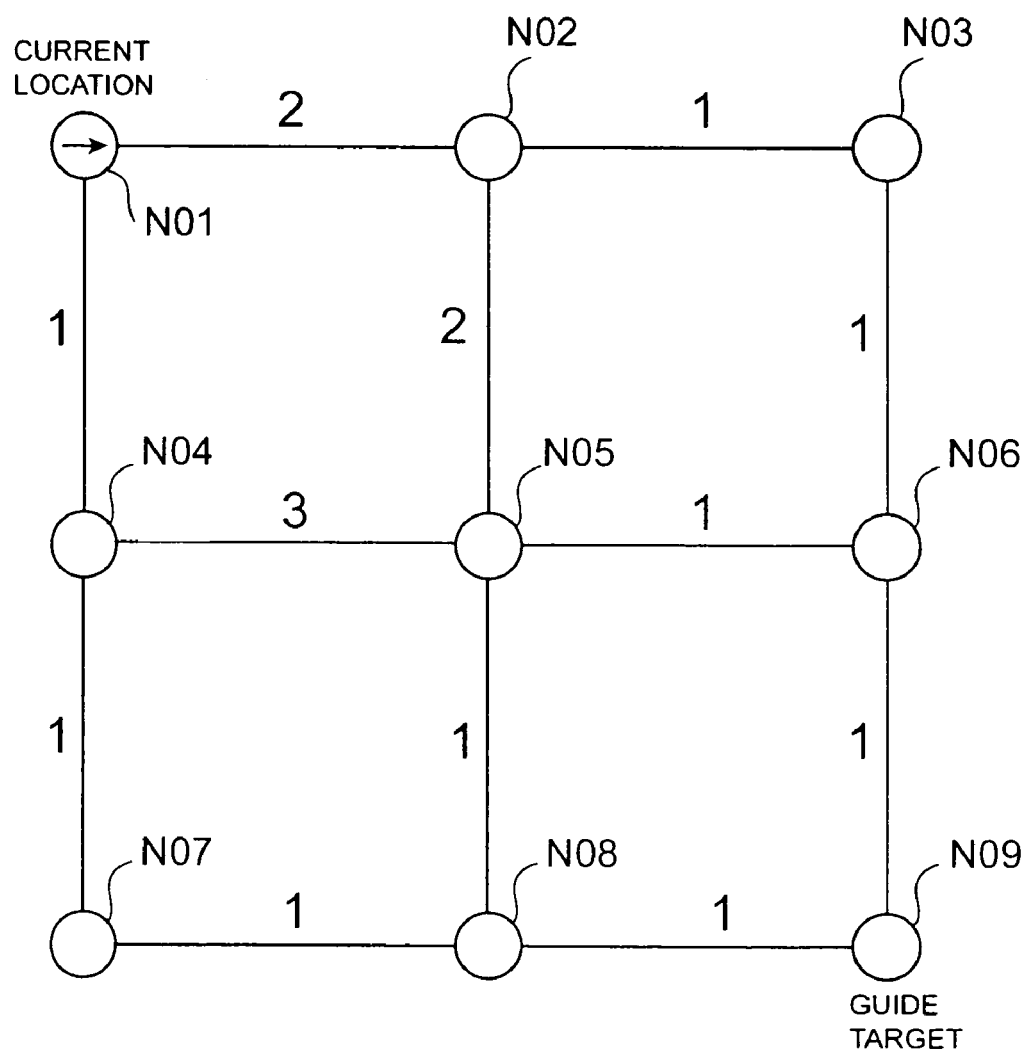
FIG. 34 illustrates processing of calculating a shortest path according to the fourth embodiment of the present invention.
Figure 36:
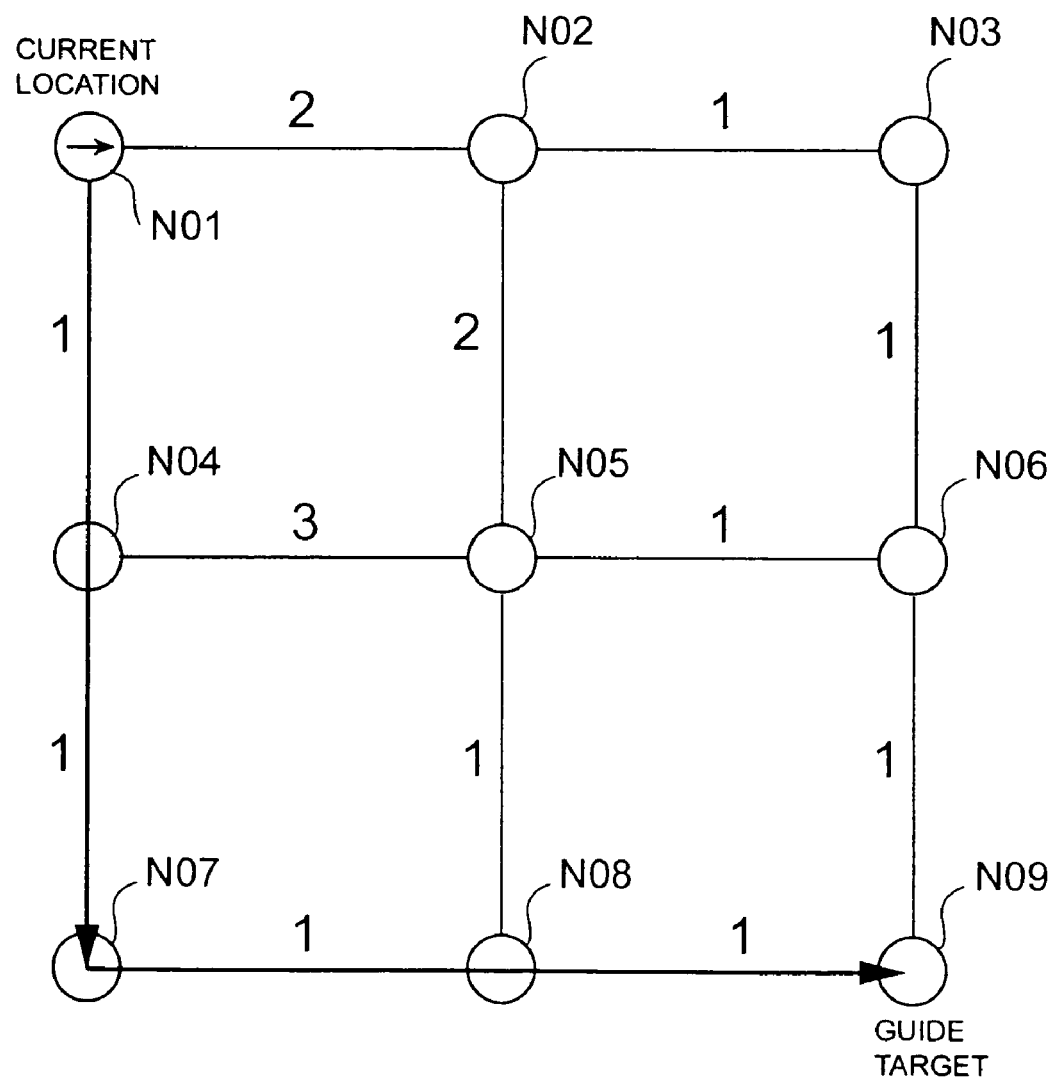
FIG. 36 illustrates a specific example of processing of calculating the shortest path according to the fourth embodiment of the present invention.
Figure 37:
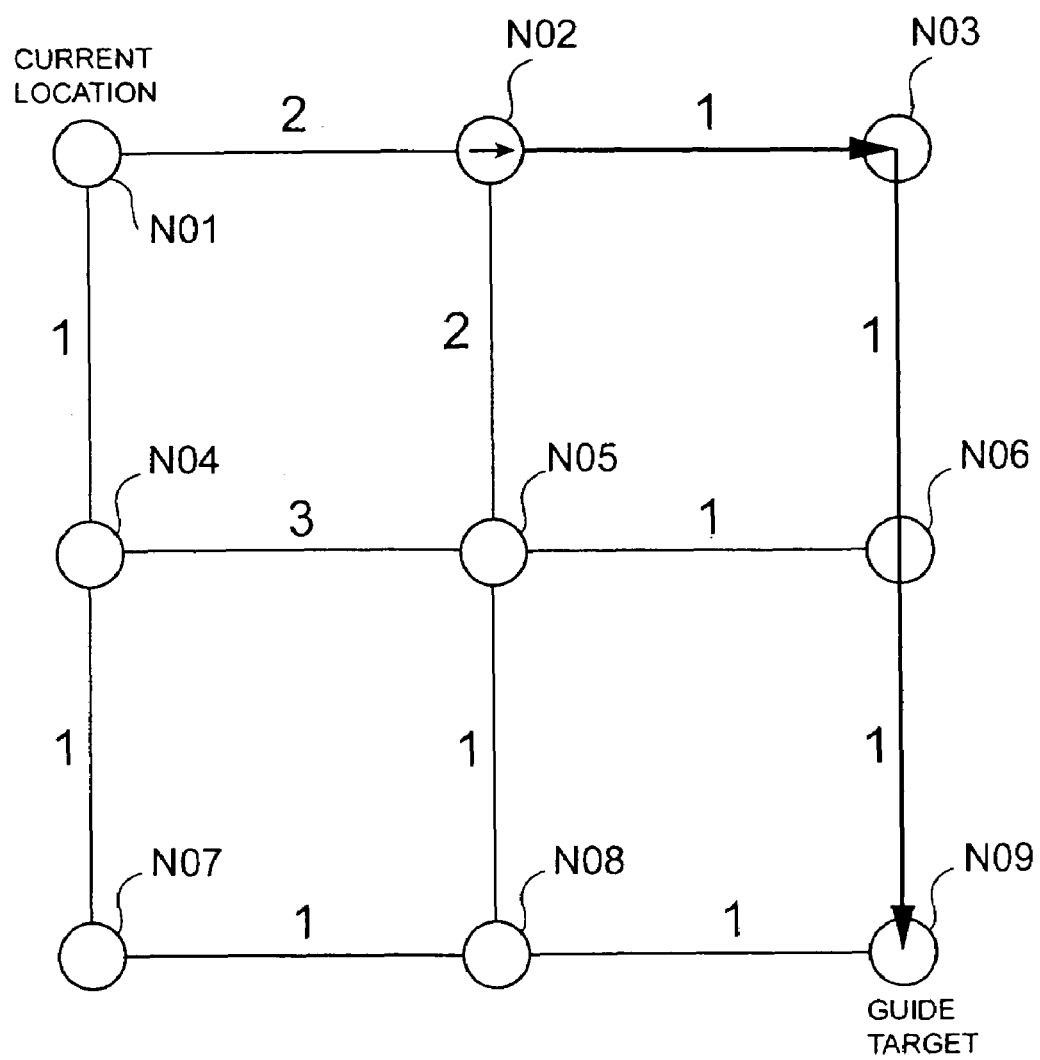
FIG. 37 illustrates a specific example of processing of calculating the shortest path according to the fourth embodiment of the present invention.
Figure 38:
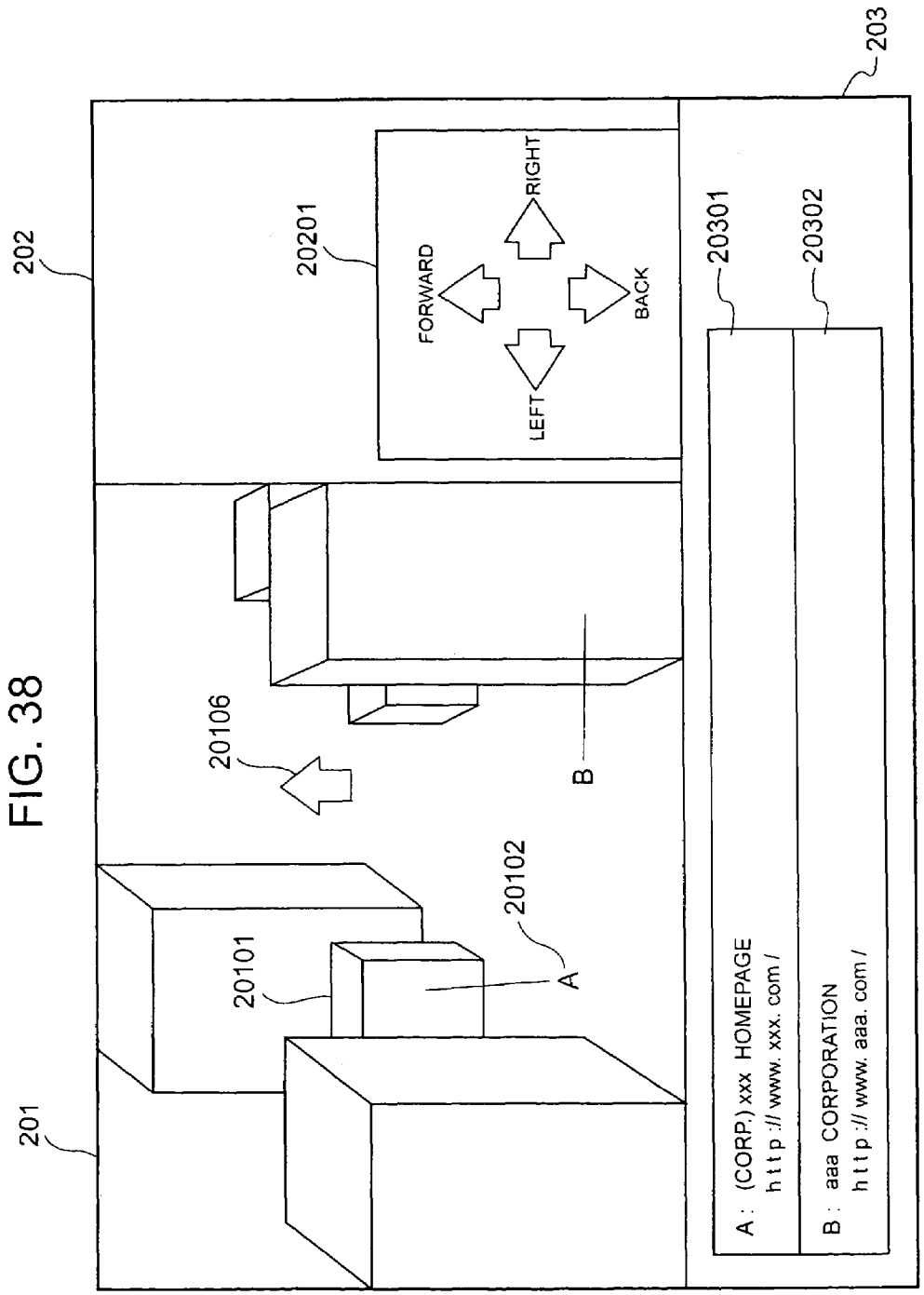
FIG. 38 illustrates a display screen of the processing result in FIG. 37.

FIG. 34 illustrates processing of calculating the shortest path according to the fourth embodiment of the present invention, FIG. 35 illustrates a configuration example of a table that stores starting nodes and arriving nodes and distances thereof shown in FIG. 34, and FIG. 36, FIG. 37 and FIG. 39 illustrate specific examples of calculating the shortest path according to the fourth embodiment of the present invention and FIG. 38 illustrates a display screen of the processing result in FIG. 37.

In FIG. 34, nodes No. 1 to No. 9 each indicate certain locations. For simplification of explanations, suppose the user is located at note No. 1 and node No. 9 is a guide target. In FIG. 34, the orientation of the user is indicated with "→" inside node No. 1 and a line between nodes (hereinafter referred to as "arc") means that the user can move between the nodes and the distance between the nodes as a value is set on each arc. For example, the user can move forward from node No. 1 to node No. 2 or to node No. 4. The distance from node No. 1 to node No. 2 is "2" and the distance from node No. 1 to node No. 4 is "1".

FIG. 35 illustrates a configuration of a table that stores a relationship between the above-described arc and distance.

In FIG. 35, field T401 stores the names of starting nodes of arcs, field T402 stores the names of arriving nodes of arcs and field T403 stores the distances between the starting nodes and arriving nodes.

The path searching portion 12 calculates the shortest path from the table shown in FIG. 35, current location and guide target. In the example shown in FIG. 34, the route from node No. 1→node No. 4 node No. 7→node No. 8 node No. 9 is the shortest path having distance "4". The shortest route may be calculated, for example, by enumerating all routes without passing through the same arc twice, calculating distances of the respective routes and selecting the shortest one.

However, the above-described calculation method is not efficient, and it is possible to use an efficient algorithm in the field of graph theory, for example. As this kind of algorithm, a Dijkstra method is generally used. This Dijkstra method is described in detail in "Bit separate volume, Computer Science and Geographic Information Processing" (under the editorship of Masao Iri, edited by Takeshi Koshizuka, Kyoritsu Publishing, pp. 151-155).

FIG. 36 illustrates the above-described shortest route of node No. 1→node No. 4→node No. 7→node No. 8→node No. 9. In this case, in order for the user to reach node No. 9 which is the guide target through the shortest route, the user needs to turn to the right at node No. 1. Thus, the 3D map/information superimposed displaying portion 2 displays a rightward arrow as the arrow 20103 in the center of the display screen shown in FIG. 32.

Then, if the user moves straight forward without following the above-described arrow 20103, that is, if the user moves from node No. 1 to node No. 2, the path searching portion 12 updates the current location to node No. 2, and recalculates the shortest route to node No. 9 which is the guide target. The shortest route in this case becomes node No. 2→node No. 3→node No. 6→node No. 9 as shown in FIG. 37.

Therefore, in order for the user to reach node No. 9 which is the guide target through the shortest route, the user needs to go straight forward at node No. 2. Thus, the 3D map/information superimposed displaying portion 2 displays an upward (straightforward) arrow as the arrow 20106 in the center of the display screen shown in FIG. 38.

Figure 39:
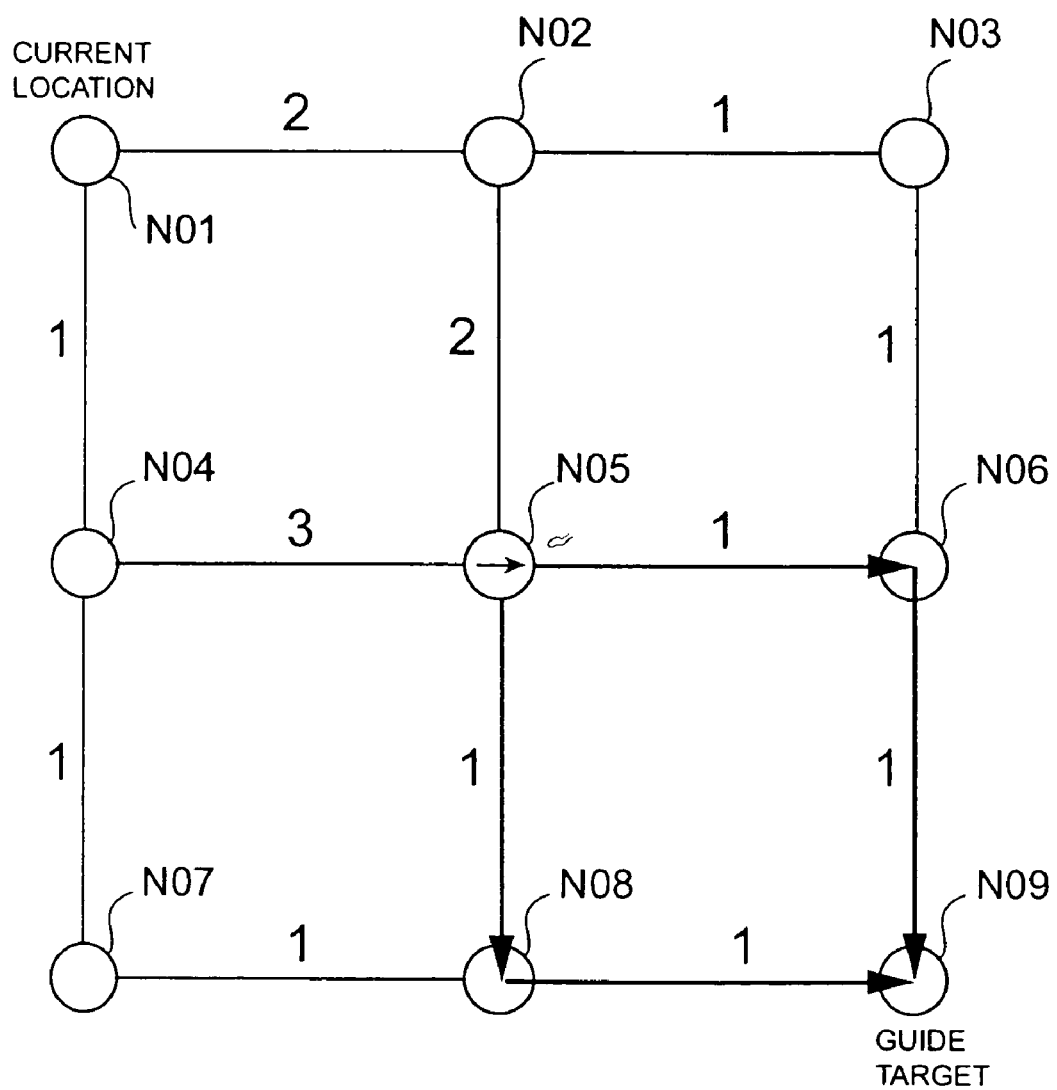
FIG. 39 illustrates a specific example of processing of calculating the shortest path according to the fourth embodiment of the present invention.

Furthermore, when the user turns to the right without following the above-described arrow 20106, that is, if the user moves from node No. 2 to node No. 5, the path searching portion 12 updates the current location to node No. 5, and recalculates the shortest route to node No. 9 which is the guide target. The shortest route in this case becomes a route of node No. 5→node No. 6→node No. 9 and a route of node No. 5→node No. 8→node No. 9 as shown in FIG. 39.

Thus, the 3D map/information superimposed displaying portion 2 displays two arrows; an upward (straightforward) arrow and a leftward arrow. As described above, the user need not always follow the guided route because the shortest route from the current location of the user to the guide target is always calculated.

Thus, in the case where there is explicitly area information the user wants to search for, the user searches for the area information using the keyword searching portion 11 first and the 3D map/information superimposed displaying portion 2 can guide the user to a place related to the search result. Furthermore, this route guide need not always be moved according to the guide, and therefore the user can receive a guide with a high degree of freedom.

Figure 40:
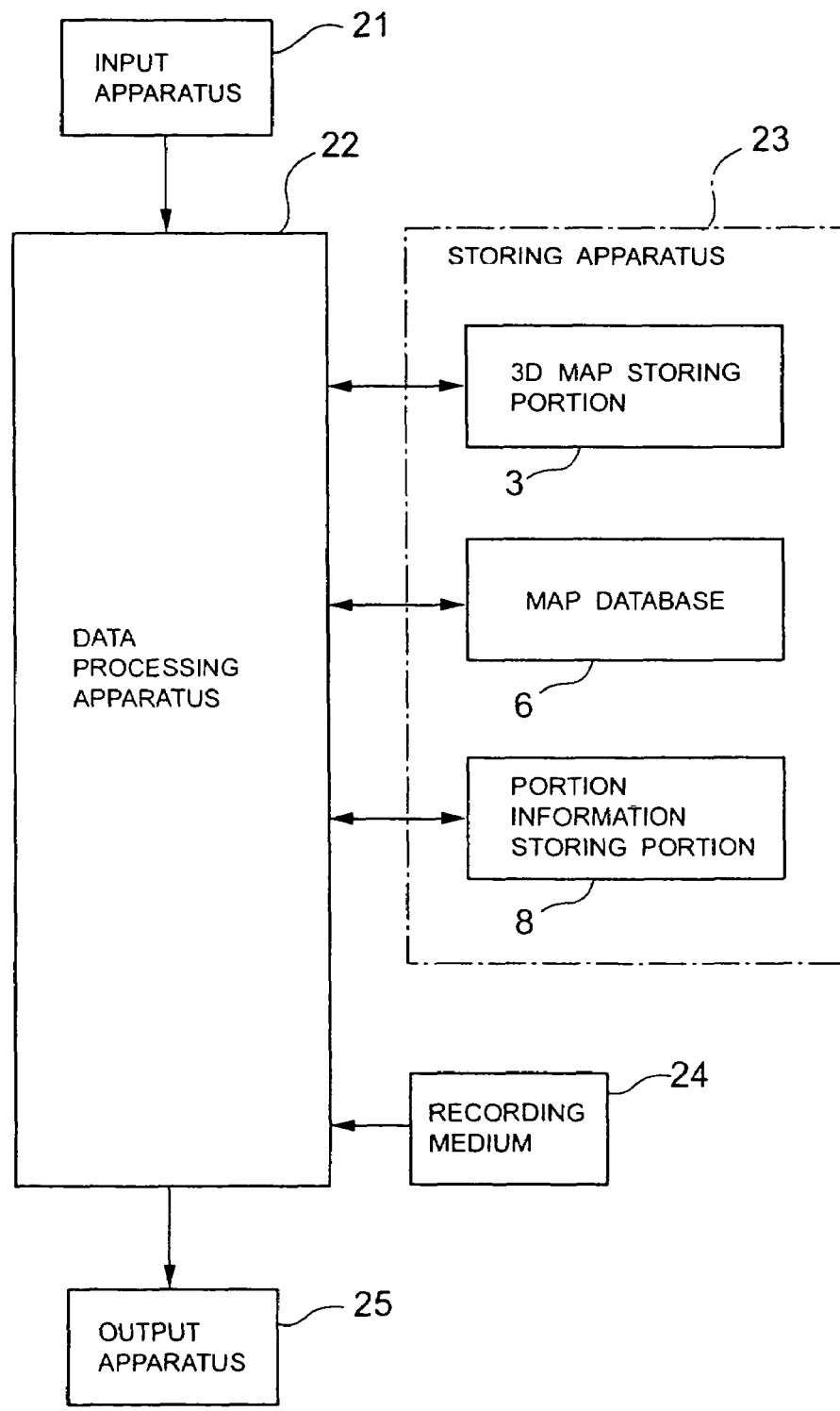
FIG. 40 is a block diagram showing a configuration of a position related information presentation system according to a fifth embodiment of the present invention.

FIG. 40 is block diagram showing a configuration of a position related information presentation system according to a fifth embodiment of the present invention. In FIG. 40, the position related information presentation system according to the fifth embodiment of the present invention is constructed of an input apparatus 21, a data processing apparatus 22, a storage apparatus 23, a recording medium 24 and an output apparatus 25.

The recording medium 24 records a program to implement the above-described position related information presentation system. As the recording medium 24, a magnetic disk, semiconductor memory, CD-ROM or other recording medium can be used.

The program for implementing the above-described position related information presentation system which is loaded from the recording medium 24 to the data processing apparatus 22 controls the operation of the data processing apparatus 22, secures the areas for the 3D map storing portion 3, map database 6 and position information storing portion 8 in the storage apparatus 23, generates the display change inputting portion 1, 3D map/information superimposed displaying portion 2, position information filtering portion 4, field of view determining portion 5 and position information searching portion 7 according to the first to fourth embodiments of the present invention on the data processing apparatus 22, and controls their respective operations. The data processing apparatus 22 executes the same processing as the processing by the position related information presentation system according to the first to fourth embodiments of the present invention under the control of the program for implementing the position related information presentation system.

Figure 41:
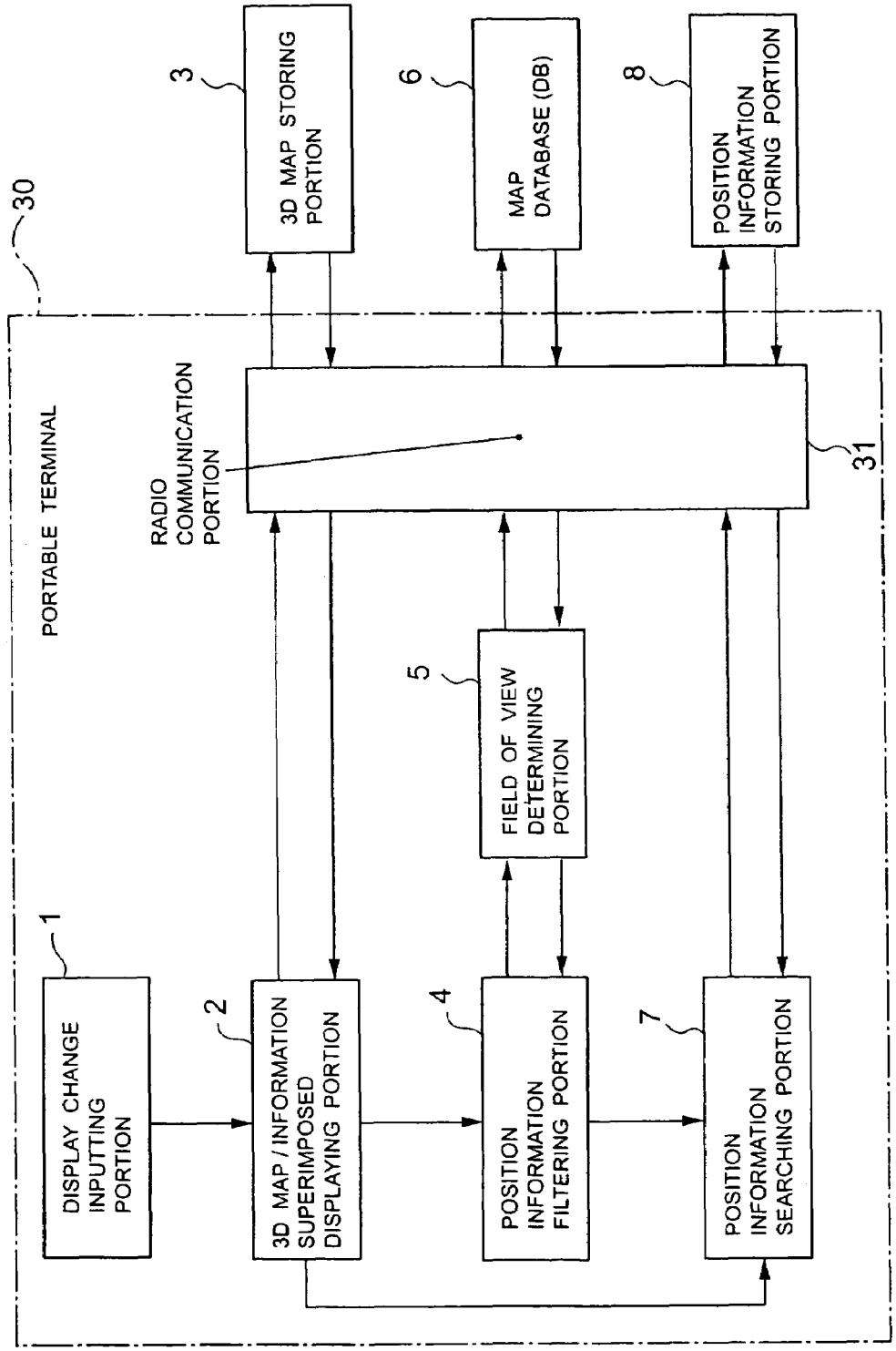
FIG. 41 is a block diagram showing a configuration of a position related information presentation system according to a sixth embodiment of the present invention.

FIG. 41 is block diagram showing a configuration of a position related information presentation system according to a sixth embodiment of the present invention. In FIG. 41, the position related information presentation system according to the sixth embodiment of the present invention is constructed of a portable terminal 30 comprising display change inputting portion 1, 3D map/information superimposed displaying portion 2, position information filtering portion 4, field of view determining portion 5, position information searching portion 7 and radio communication section 31, and 3D map storing portion 3, a map database 6 and position information storing portion 8.

This embodiment operates in the same way as for the first embodiment of the present invention except in that the 3D map/information superimposed displaying portion 2, the position information filtering portion 4, the field of view determining portion 5 and the position information searching portion 7 in the above-described portable terminal 30 acquire data from the 3D map storing portion 3, the map database 6 and the position information storing portion 8 through the radio communication section 31, respectively. In this case, the user can receive a guide with a high degree of freedom by simply inputting the current location and a guide target to the portable terminal 30.

If the above-described portable terminal 30 incorporates any one of position granularity calculating portion 9, user operation intention determining portion 10, keyword detecting portion 11 or path searching portion 12, this embodiment can also operate in the same way as the second to fourth embodiments of the present invention.

Thus, by providing the field of view determining portion 5 that determines the field of view of the user on the 3D map and the position information filtering portion 4 that extracts area information actually visible to the user from the area information search result based on this determination result, it is possible to solve the conventional problem that when the user stands in that place in the real world, even information that the user actually cannot see due to the shadows of buildings, etc. is searched.

Moreover, by providing the position granularity calculating portion 9 that calculates the granularity of the area indicating the division level on the map of the area covered by the area information searched and the user operation intention determining portion 10 that determines whether the user needs rough information or detailed information judging from the user's operation on the 3D map, it is possible to solve the conventional problem that it is unable to select information to be presented according to the way the user walks around on the map.

Furthermore, this embodiment not only allows the user to search for peripheral information while walking around on the 3D map, but also includes the keyword searching portion 11 and path searching portion 12 in its configuration allowing the user to search information using keywords beforehand and navigate to a place related to the information on the 3D map, and recalculating the path every time the user location changes thus eliminating the need for the user to always follow the guide. Thus, the user can receive a guide with a high degree of freedom.

Thus, this embodiment allows the user to experience as if the user had actually walked around and collected information about the area and can provide information according to the way the user walks around on the 3D map and the effective geographical range covered by each piece of information.

As described above, the position related information presentation system according to the present invention provides a position related information presentation system that displays area information related to a position specified by position information on a three-dimensional map using a computer system, capable of detecting a change of state of the three-dimensional map, searching for area information at the current location from a database judging from the current state of the map, extracting information of buildings in the field of view of the operator from the search result and displaying this extraction result, thereby providing an effect that the user can experience as if the user had actually walked around and collected information about the area.

Furthermore, in addition to the above-described processing, the position related information presentation system according to the present invention searches position-related information from a database using keywords, calculates the shortest path on the map from the current position to the place related to the search result and displays a route guide to the place related to the search result based on this calculation result, thus producing an effect of providing information according to the way the user walks around on the three-dimensional map and the effective geographical range covered by each piece of information.

What is claimed is:

1. A position related information presentation system, comprising:
    field of view determining means for detecting, with respect to a display of area information related to a position indicated by data of a three-dimensional map superimposed on the data of said three-dimensional map, information on superimposing of one object on another in a predetermined angle range centered on the moving direction from the current position;
    position information filtering means for searching for said related area information from said area information using information on superimposing of one object on another;
    keyword searching means for searching for said area information based on input/output keywords; and
    path searching means for searching for a path up to the position specified by said area information searched from the current position by said keyword searching means.

2. The position related information presentation system according to claim 1, wherein said path searching means researches for said path every time whenever said current position is changed.

3. A position related information presentation method, comprising the steps of:
    detecting, with respect to a display of area information related to a position indicated by data of a three-dimensional map superimposed on the data of said three-dimensional map, information on superimposing of one object on another in a predetermined angle range centered on the moving direction from the current position;
    searching for said related area information from said area information using information on superimposing of one object on another;
    searching for said area information based on input/output keywords; and
    searching for a path from the current position to the position specified by said searched area information, wherein a guide to the position specified by said area information is displayed based on this search result.

4. The position related information presentation method according to claim 3, wherein said path is searched every time whenever said current position is changed.

5. A computer readable medium for storing a position related information presentation control program, when executed by a computer, for presenting position related information through the steps of:
    detecting, with respect to a display of area information related to a position indicated by data of a three-dimensional map superimposed on the data of said three-dimensional map, information on superimposing of one object on another in a predetermined angle range centered on the moving direction from the current position;
    searching for said related area information from said area information using said information on superimposing of one object on another;
    searching for said area information based on input/output keywords; and
    searching for a path up to the position specified by said area information searched from the current position.

6. A portable terminal apparatus of a position related information presentation system, comprising:
    superimposed displaying means for displaying area information related to a position expressed with data of a three-dimensional map superimposed on the data of said three-dimensional map;
    field of view determining means for detecting information on superimposing of one object on another in a predetermined angle range centered on the moving direction from the current position with respect to the display of said superimposed displaying means;
    position information filtering means for searching for said related area information from said area information related to a new display position detected in response to a display change instruction using said information on superimposing of one object on another;
    keyword searching means for searching for said area information based on input/output keywords; and path searching means for searching for a path up to the position specified by said area information searched from the current position by said keyword searching means, wherein a guide to the position specified with said area information is displayed based on the search result by said path searching means.

7. A position related information presentation method including a portable terminal apparatus, comprising the steps of:

displaying area information related to a position expressed with data of a three-dimensional map superimposed on the data of said three-dimensional map;

detecting information on superimposing of one object on another in a predetermined angle range centered in the moving direction from the current position with respect to the display;

searching for said related area information from said area information using said information on superimposing of one object on another;

searching for said area information based on input/output keywords; and searching for a path from the current position to the position specified by said searched area information, wherein a guide to a position specified by said area information is displayed based on this search result.

8. A computer readable medium for storing a position related information presentation control program, when executed by a portable computer, for presenting position related information through the steps of:

displaying area information related to a position expressed with data of a three-dimensional map superimposed on the data of said three-dimensional map;

detecting information on superimposing of one object on another in a predetermined angle range centered on the moving direction from the current position with respect to the display;

searching for said related area information from said area information using said information on superimposing of one object on another;

searching for said area information based on input/output keywords;

searching for the path from the current position to the position specified by said searched area information; and displaying a guide to the position specified by said area information based on this search result.

* * * * *